US012184651B2

(12) United States Patent
Pike et al.

(10) Patent No.: US 12,184,651 B2
(45) Date of Patent: *Dec. 31, 2024

(54) METHODS, SYSTEMS, AND APPARATUSES FOR IMPROVED MULTI-FACTOR AUTHENTICATION IN A MULTI-APP COMMUNICATION SYSTEM

(71) Applicant: Salesforce, Inc., San Francisco, CA (US)

(72) Inventors: Mark Pike, Oakland, CA (US); Roland Schemers, Woodside, CA (US); James McPhail, San Francisco, CA (US); Matthew Wahl, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 17/949,806

(22) Filed: Sep. 21, 2022

(65) Prior Publication Data

US 2023/0020457 A1 Jan. 19, 2023

Related U.S. Application Data

(63) Continuation of application No. 16/263,889, filed on Jan. 31, 2019, now Pat. No. 11,489,833.

(51) Int. Cl.
H04L 9/40 (2022.01)

(52) U.S. Cl.
CPC ........ *H04L 63/0884* (2013.01); *H04L 63/102* (2013.01)

(58) Field of Classification Search
CPC .... G06F 21/564; G06F 21/566; G06F 21/565; G06F 21/602; G06F 21/561;
(Continued)

(56) References Cited

U.S. PATENT DOCUMENTS 8,087,068 B1 * 12/2011 Downey ................. G06F 21/34
726/4
10,887,307 B1 * 1/2021 Newstadt .............. H04L 63/102
(Continued)

OTHER PUBLICATIONS

European Patent Application 22204744.1 Extended Search Report issued Feb. 7, 2023.
(Continued)

*Primary Examiner* — Matthew Smithers
*Assistant Examiner* — Shu Chun Gao
(74) *Attorney, Agent, or Firm* — Holland & Hart LLP

(57) ABSTRACT

Embodiments of the present disclosure relate to verifying a third-party resource by automatically validating multi-factor message codes associated with the third-party resource to enable access to functionality associated with the third-party resource via a multi-app communication system. An example embodiment includes a multi-app communication system including at least one processor and at least one memory. The embodiment multi-app communication system is configured to receive a sign-in request from a multi-app communication system application executed on a client device, and cause transmission of a multi-factor confirmation message to a verified third-party multi-factor authentication resource. The embodiment multi-app communication system is further configured query the verified third-party multi-factor authentication resource to identify the multi-factor confirmation message, and enable access to the third-party resource.

20 Claims, 7 Drawing Sheets

(58) Field of Classification Search
CPC .......... G06F 21/568; G06F 2221/2107; H04L 63/1416; H04L 63/20; H04L 63/1441
See application file for complete search history.

(56) References Cited

U.S. PATENT DOCUMENTS

| | | | |
|---|---|---|---|
| 2008/0263652 A1* | 10/2008 | McMurtry | G06F 21/335 726/5 |
| 2009/0300744 A1 | 12/2009 | Guo et al. | |
| 2013/0191139 A1* | 7/2013 | Chen | H04L 9/3226 705/2 |
| 2018/0041510 A1 | 2/2018 | Burch et al. | |
| 2018/0159852 A1 | 6/2018 | Crabtree et al. | |
| 2018/0253458 A1* | 9/2018 | Goyal | G06F 16/23 |
| 2018/0287982 A1 | 10/2018 | Draeger et al. | |
| 2018/0337784 A1* | 11/2018 | Jain | G06F 21/335 |

OTHER PUBLICATIONS

"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013) 2 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.
David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html> (dated May 28, 2014) 8 pages.
Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014) 4 pages.
Matsumoto, T. et al., "Chocoa Communicator - A New Communication System Based on Awareness and Text Communications—", FUJITSU Sci. Tech. J., 36, 2, (Dec. 2000) 154-161.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014), 2 pages.
Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.
Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015), 3 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

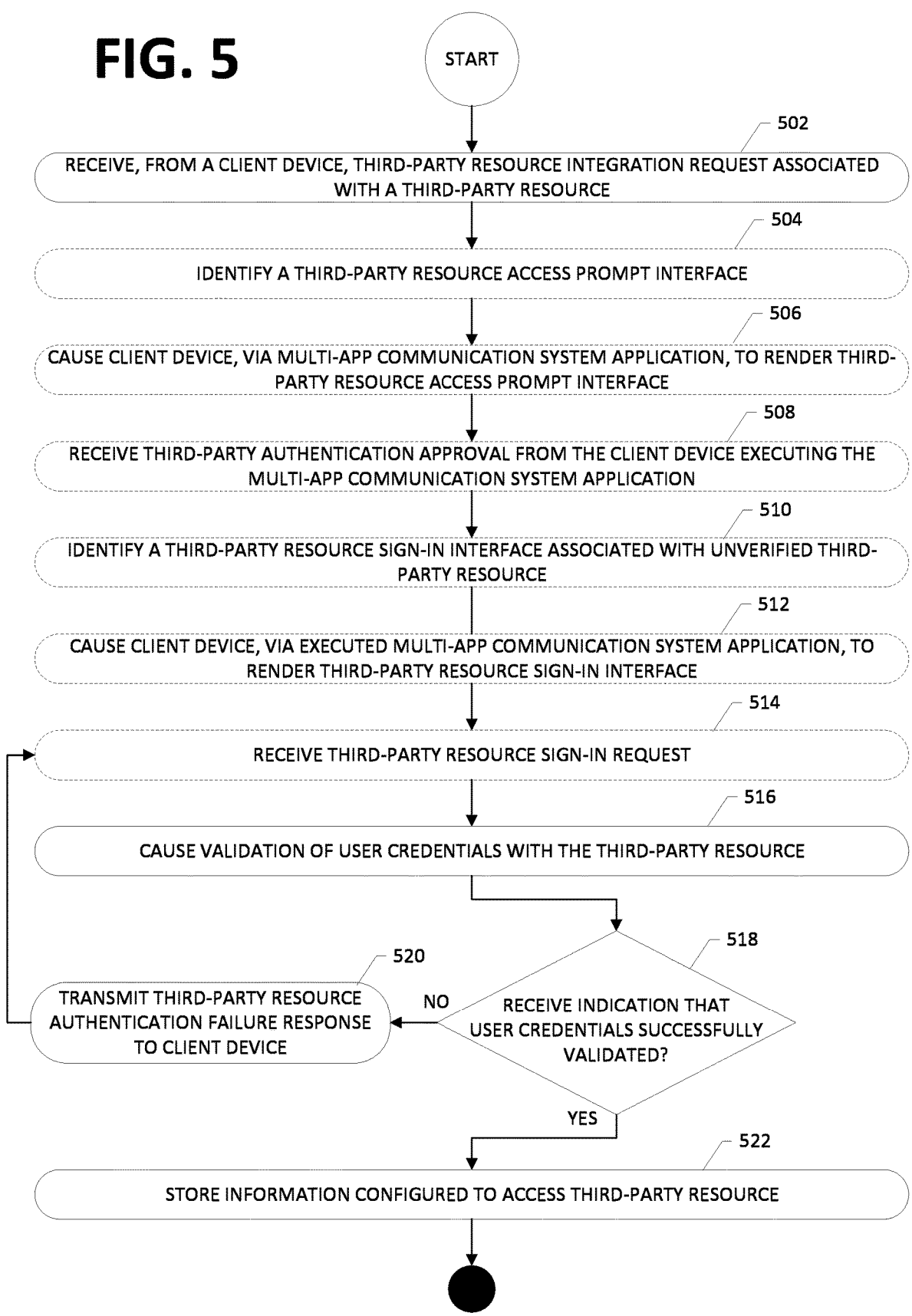

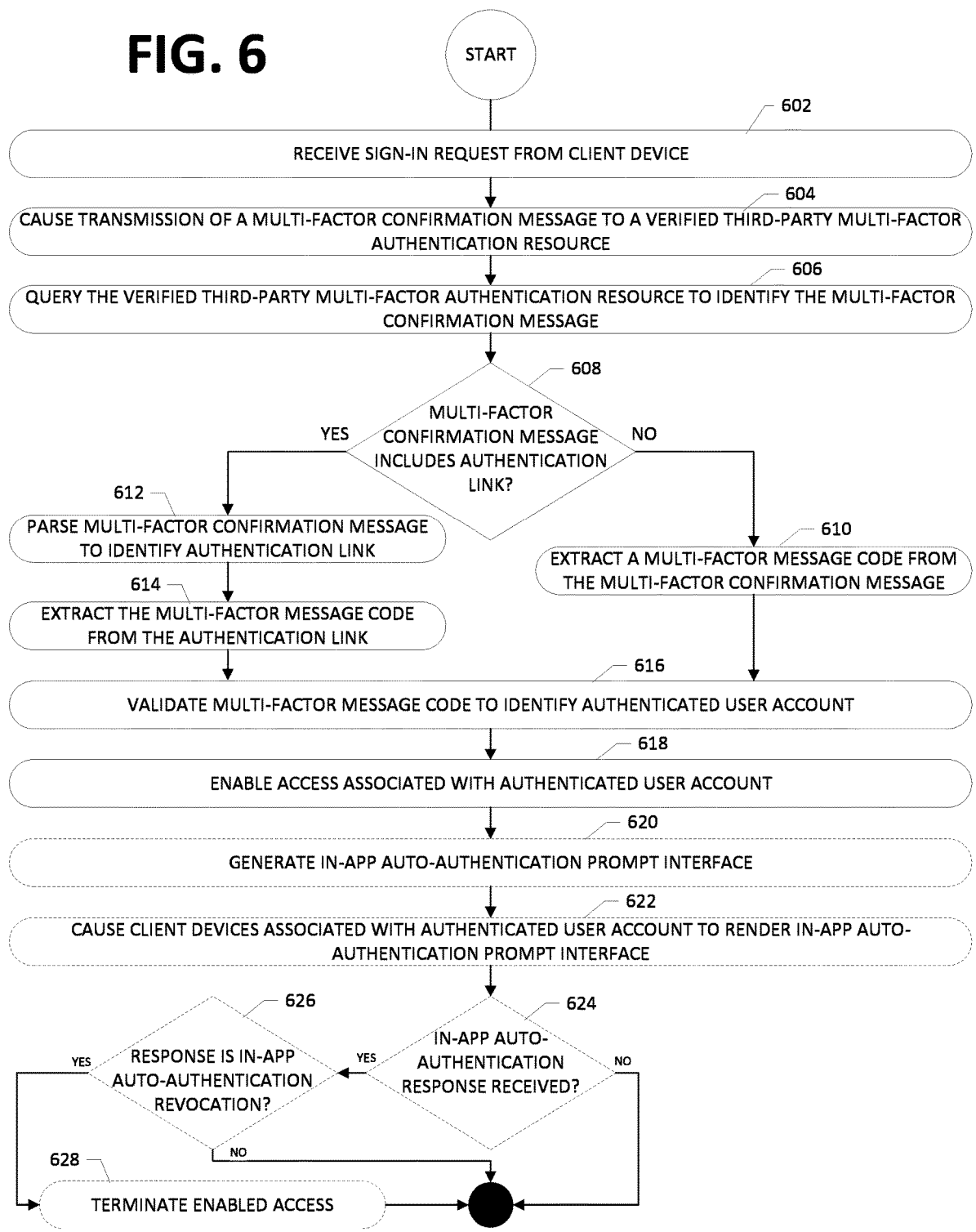

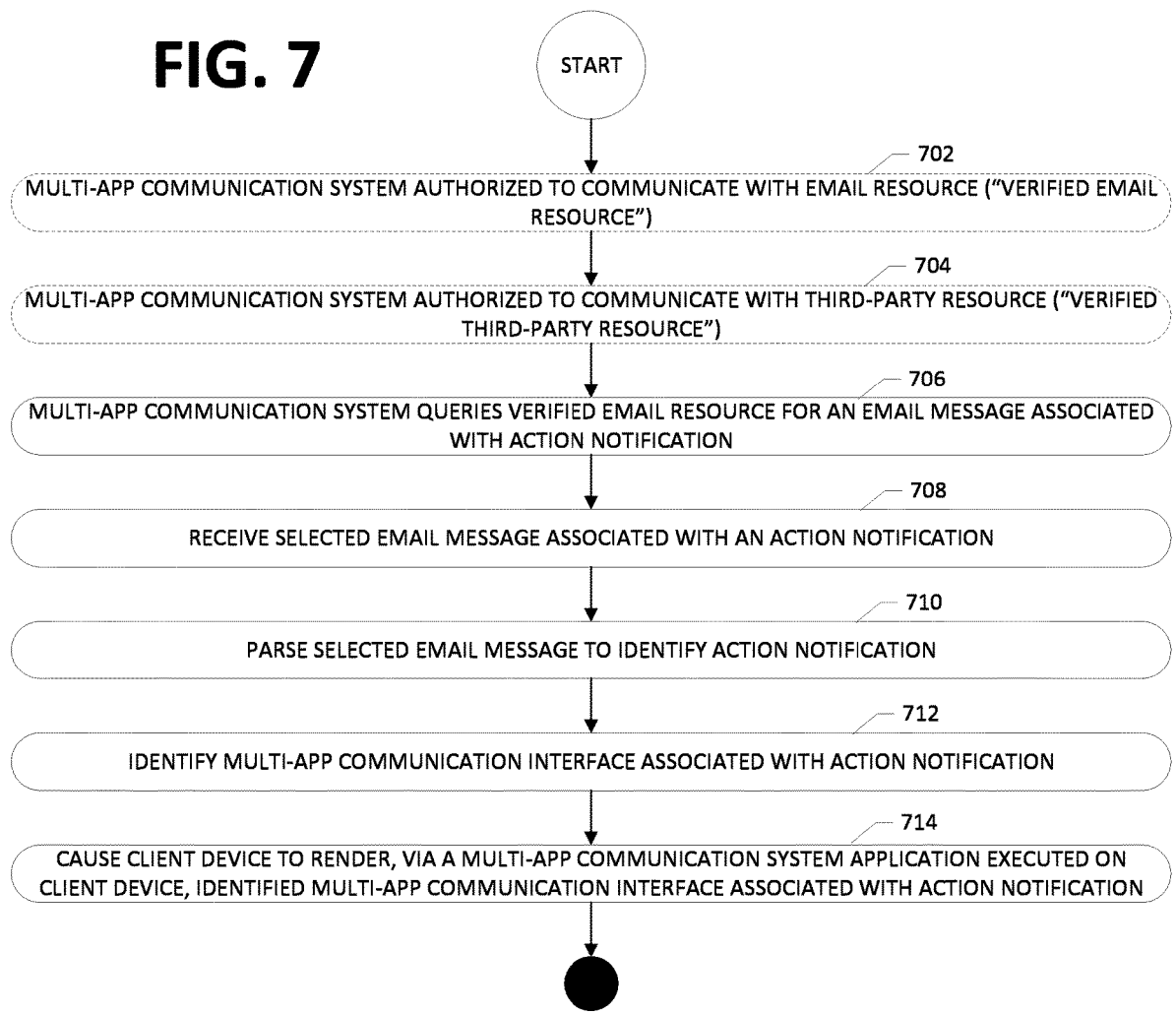

METHODS, SYSTEMS, AND APPARATUSES FOR IMPROVED MULTI-FACTOR AUTHENTICATION IN A MULTI-APP COMMUNICATION SYSTEM

CROSS-REFERENCE TO RELATED APPLICATIONS

This application is a continuation application claiming priority benefit, with regard to all common subject matter, of U.S. patent application Ser. No. 16/263,889, filed Jan. 31, 2019, and entitled "METHODS, SYSTEMS, AND APPARATUSES FOR IMPROVED MULTI-FACTOR AUTHENTICATION IN A MULTI-APP COMMUNICATION SYSTEM," which is hereby incorporated by reference in its entirety.

TECHNOLOGICAL FIELD

Embodiments of the present disclosure relate, generally, to multi-factor authentication, and more specifically, to configuring a multi-app communication system to verify a third-party resource configured to utilize multi-factor authentication by, during an authenticated session associated with an authenticated user account, validating, without user engagement, a multi-factor confirmation message associated with the authenticated user account.

BACKGROUND

Various software resources and applications employ two-factor authentication protocols when authenticating users. Applicant has identified a number of deficiencies and problems associated with conventional application of such two-factor authentication protocols. Through applied effort, ingenuity, and innovation, Applicant has developed solutions that are included in embodiments of the present disclosure, many of which are described in detail herein.

BRIEF SUMMARY

Embodiments herein are directed to providing authenticated access to functionality of a third-party resource and/or multi-app communication system via communication with a verified third-party multi-factor authentication resource for automatic identification and validation of a multi-factor message code.

An example embodiment includes a multi-app communication system capable of communication with a verified third-party multi-factor authentication resource. The example multi-app communication system also is also capable of communication with a client device executing a multi-app communication system application for accessing the multi-app communication system and/or third-party resources. The example multi-app communication system includes at least a processor and a memory associated with the processor. The memory includes computer coded instructions therein. The memory and computer coded instructions are configured to, with the processor, cause the multi-app communication system to receive a third-party sign-in request from a multi-app communication system application executed on the client device during an authenticated session associated with an authenticated user account. The example multi-app communication system is further caused to cause transmission of a multi-factor confirmation message to the verified third-party multi-factor authentication resource. The example multi-app communication system is further caused to query the verified third-party multi-factor authentication resource to identify the multi-factor confirmation message. The example multi-app communication system is further caused to enable access to the third-party resource during the authenticated session associated with the authenticated user account.

Another example embodiment includes a multi-app communication apparatus capable of communication with a verified third-party multi-factor authentication resource. The example multi-app communication apparatus also is also capable of communication with a client device executing a multi-app communication system application for accessing the multi-app communication apparatus and/or third-party resources. The example multi-app communication apparatus includes at least a processor and a memory associated with the processor. The memory includes computer coded instructions therein. The memory and computer coded instructions are configured to, with the processor, cause the multi-app communication apparatus to receive a third-party sign-in request from a multi-app communication system application executed on the client device during an authenticated session associated with an authenticated user account. The example multi-app communication apparatus is further caused to cause transmission of a multi-factor confirmation message to the verified third-party multi-factor authentication resource. The example multi-app communication apparatus is further caused to query the verified third-party multi-factor authentication resource to identify the multi-factor confirmation message. The example multi-app communication apparatus is further caused to enable access to the third-party resource during the authenticated session associated with the authenticated user account.

Another example embodiment includes a method for providing authenticated access to a third-party resource via a multi-app communication system capable of communication with a verified third-party multi-factor authentication resource, where the multi-app communication system is capable of communication with a multi-app communication system application executed on a client device. The example method includes receiving a third-party sign-in request from a multi-app communication system application executed on the client device during an authenticated session associated with an authenticated user account. The example method further includes causing transmission of a multi-factor confirmation message to the verified third-party multi-factor authentication resource. The example method further includes querying the verified third-party multi-factor authentication resource to identify the multi-factor confirmation message. The example method further includes enabling access to the third-party resource during the authenticated session associated with the authenticated user account.

Another example embodiment includes a computer program product for providing authenticated access to a third-party resource via a multi-app communication system capable of communication with a verified third-party multi-factor authentication resource, where the multi-app communication system is capable of communication with a multi-app communication system application executed on a client device. The example computer program product includes at least one non-transitory computer-readable storage medium having computer-executable program code instructions stored therein. The example computer program product includes computer-executable program code instructions for receiving a third-party sign-in request from a multi-app communication system application executed on the client device during an authenticated session associated with an authenticated user account. The example computer program product further includes program code instructions for causing transmission of a multi-factor confirmation message to the verified third-party multi-factor authentication resource. The example computer program product further includes program code instructions for querying the verified third-party multi-factor authentication resource to identify the multi-factor confirmation message. The example computer program product further includes program code instructions for enabling access to the third-party resource during the authenticated session associated with the authenticated user account.

Some example embodiments are caused to, include, or otherwise include instructions for extracting a multi-factor message code from the multi-factor confirmation message and causing validation of the multi-factor message code.

Some example embodiments are caused to, include, or otherwise include instructions for parsing the multi-factor confirmation message to identify an authentication link comprising the multi-factor message code and extracting the multi-factor message code from the authentication link.

Some example embodiments are caused to, include, or otherwise include instructions for generating a sign-in prompt interface and causing the client device, via the multi-app communication system application, to render the sign-in prompt interface, where the third-party sign-in request is received in response to engagement with the sign-in prompt interface via the client device.

Some example embodiments are caused to, include, or otherwise include instructions for receiving verified resource information associated with the third-party resource, where the verified resource information is configured to enable access to the third-party resource, and storing the verified resource information associated with the authenticated user account.

Some example embodiments, the verified resource information includes a third-party resource authentication token associated with the third-party resource. Additionally or alternatively, in some embodiments, the third-party resource authentication token is linked to a particular third-party resource user account.

Some example embodiments are caused to, include, or otherwise include instructions for identifying user account details associated with the authenticated user account, causing the third-party resource to validate the user account details to the third-party resource using a primary authentication method, and receiving an authentication response indicating the user account details are associated with a third-party resource user account.

Some example embodiments are caused to, include, or otherwise include instructions for transmitting a third-party multi-factor authentication resource access request, causing the client device to, via the multi-app communication system application, render the third-party multi-factor authentication resource access prompt interface, and receiving third-party multi-factor authentication resource access approval in response to user engagement with the third-party multi-factor authentication resource access prompt interface.

Some example embodiments are caused to, include, or otherwise include instructions for transmitting a third-party resource access request, causing the client device to, via the multi-app communication system application, render the third-party resource access prompt interface, and receiving a third-party resource access approval in response to user engagement with the third-party resource access prompt interface.

Some example embodiments are caused to, include, or otherwise include instructions for generating the multi-factor confirmation message, and causing transmission of the multi-factor confirmation message by transmitting the multi-factor confirmation message to the verified third-party multi-factor authentication resource.

Some example embodiments are caused to, include, or otherwise include instructions for causing transmission of the multi-factor confirmation message by transmitting a multi-factor request to the third-party resource to cause transmission of the multi-factor confirmation message to the verified third-party multi-factor authentication resource.

Some example embodiments are caused to, include, or otherwise include instructions for generating an in-app auto-authentication prompt interface in response to launching the authenticated session, causing a second client device to render the in-app auto-authentication prompt interface, and receiving an in-app auto-authentication approval in response to user engagement with the in-app auto-authentication prompt interface.

Some example embodiments are caused to, include, or otherwise include instructions for generating an in-app auto-authentication prompt interface in response to launching the authentication session, causing a second client device to render the in-app auto-authentication prompt interface, receiving an in-app auto-authentication revocation in response to user engagement with the in-app auto-authentication prompt interface, and terminating the authenticated session in response to the in-app auto-authentication revocation.

In some example embodiments, the multi-factor confirmation message includes an email message, and the verified third-party multi-factor authentication resource comprises a verified email resource. In some example embodiments, enabled access to the third-party resource is associated with a one time-session.

Some example embodiments are caused to, include, or otherwise include instructions for verifying the client device is configured to access the verified third-party multi-factor authentication resource. Some example embodiments are caused to, include, or otherwise include instructions for verifying the client device is configured to access the verified third-party multi-factor authentication resource by identifying a target instance identifier associated with the third-party sign-in request, identifying a confirmation instance identifier, and validating the confirmation instance identifier based on the target instance identifier.

In some embodiments, the target instance identifier includes one selected from the group including a device identifier, an internet protocol address, a location associated with the client device, and an application identifier. In some embodiments, the confirmation instance identifier includes one selected from the group including a device identifier, an internet protocol address, a location associated with the client device, and an application identifier.

Some example embodiments are caused to, include, or otherwise include instructions for parsing the multi-factor confirmation message to identify an action notification, and causing the client device, via the multi-app communication system application executed on the client device, to render a multi-app communication system interface associated with the action notification. In some embodiments, the action notification includes a third-party resource action notification associated with the third-party resource, and the multi-app communication system interface is associated with the third-party resource.

Another example embodiment includes a multi-app communication system capable of communication with a verified third-party multi-factor authentication resource. The example multi-app communication system also is also capable of communication with a client device executing a multi-app communication system application for accessing the multi-app communication system. The example multi-app communication system includes at least a processor and a memory associated with the processor. The memory includes computer coded instructions therein. The memory and computer coded instructions are configured to, with the processor, cause the multi-app communication system to receive a multi-factor sign-in request from a multi-app communication system application executed on the client device during an authenticated session associated with an authenticated user account. The example multi-app communication system is further caused to cause transmission of a multi-factor confirmation message to the verified third-party multi-factor authentication resource. The example multi-app communication system is further caused to query the verified third-party multi-factor authentication resource to identify the multi-factor confirmation message. The example multi-app communication system is further caused to launch an authenticated session associated with an authenticated user account based on the identified multi-factor confirmation message.

Another example embodiment includes a multi-app communication apparatus capable of communication with a verified third-party multi-factor authentication resource. The example multi-app communication apparatus also is also capable of communication with a client device executing a multi-app communication system application for accessing the multi-app communication apparatus and/or third-party resources. The example multi-app communication apparatus includes at least a processor and a memory associated with the processor. The memory includes computer coded instructions therein. The memory and computer coded instructions are configured to, with the processor, cause the multi-app communication apparatus to receive a multi-app sign-in request from a multi-app communication system application executed on the client device during an authenticated session associated with an authenticated user account. The example multi-app communication apparatus is further caused to cause transmission of a multi-factor confirmation message to the verified third-party multi-factor authentication resource. The example multi-app communication apparatus is further caused to query the verified third-party multi-factor authentication resource to identify the multi-factor confirmation message. The example multi-app communication apparatus is further caused to launch an authenticated session associated with an authenticated user account based on the identified multi-factor confirmation message.

Another example embodiment includes a method for providing authenticated access to a third-party resource via a multi-app communication system capable of communication with a verified third-party multi-factor authentication resource, where the multi-app communication system is capable of communication with a multi-app communication system application executed on a client device. The example method includes receiving a multi-app sign-in request from a multi-app communication system application executed on the client device during an authenticated session associated with an authenticated user account. The example method further includes causing transmission of a multi-factor confirmation message to the verified third-party multi-factor authentication resource. The example method further includes querying the verified third-party multi-factor authentication resource to identify the multi-factor confirmation message. The example method further includes launching an authenticated session associated with an authenticated user account based on the identified multi-factor confirmation message.

Another example embodiment includes a computer program product for providing authenticated access to a third-party resource via a multi-app communication system capable of communication with a verified third-party multi-factor authentication resource, where the multi-app communication system is capable of communication with a multi-app communication system application executed on a client device. The example computer program product includes at least one non-transitory computer-readable storage medium having computer-executable program code instructions stored therein. The example computer program product includes computer-executable program code instructions for receiving a multi-app sign-in request from a multi-app communication system application executed on the client device during an authenticated session associated with an authenticated user account. The example computer program product further includes program code instructions for causing transmission of a multi-factor confirmation message to the verified third-party multi-factor authentication resource. The example computer program product further includes program code instructions for querying the verified third-party multi-factor authentication resource to identify the multi-factor confirmation message. The example computer program product further includes program code instructions for launching an authenticated session associated with an authenticated user account based on the identified multi-factor confirmation message.

Some example embodiments are caused to, include, or otherwise include instructions for extracting user authentication credentials from the multi-factor sign-in request, validating the user authentication credentials using a primary authentication method, and identifying an authenticated user account based on the validated user authentication credentials, where querying the verified third-party multi-factor authentication resource is based on the identified authenticated user account.

Some example embodiments are caused to, include, or otherwise include instructions for extracting a multi-factor message code from the multi-factor confirmation message, and causing validation of the multi-factor message code.

In some embodiments, extracting the multi-factor message code from the multi-factor confirmation message includes parsing the multi-factor confirmation message to identify an authentication link comprising the multi-factor message code, and extracting the multi-factor message code from the authentication link.

Some example embodiments are caused to, include, or otherwise include instructions for generating a multi-app communication system sign-in prompt interface and causing the client device to, via the multi-app communication system application, render the multi-app communication system sign-in prompt interface, where the multi-factor sign in request is received in response to engagement with the multi-app communication system sign-in prompt interface via the client device.

Some example embodiments are caused to, include, or otherwise include instructions for transmitting a third-party resource access request, causing the client device, via the multi-app communication system application, to render a third-party resource access prompt interface, and receiving a third-party resource access approval in response to user engagement with the third-party resource access prompt interface.

Some example embodiments are caused to, include, or otherwise include instructions for generating the multi-factor confirmation message, where causing transmission of the multi-factor confirmation message includes transmitting the multi-factor confirmation message to the verified third-party multi-factor authentication resource.

Some example embodiments are caused to, include, or otherwise include instructions for transmitting a multi-factor request to the third-party resource to cause transmission of the multi-factor confirmation message to the verified third-party multi-factor authentication resource.

Some example embodiments are caused to, include, or otherwise include instructions for generating an in-app auto-authentication prompt interface in response to launching the authenticated session, causing a second client device to render the in-app auto-authentication prompt interface, and receiving an in-app auto-authentication approval in response to user engagement with the in-app auto-authentication prompt interface.

Some example embodiments are caused to, include, or otherwise include instructions for generating an in-app auto-authentication prompt interface in response to launching the authenticated session, causing a second client device to render the in-app auto-authentication prompt interface, and receiving an in-app auto-authentication revocation in response to user engagement with the in-app auto-authentication prompt interface, and terminating the authenticated session in response to the in-app auto-authentication revocation.

In some example embodiments, the multi-factor confirmation message includes an email message, and the verified third-party multi-factor authentication resource includes a verified email resource. In some embodiments, the multi-factor confirmation message is associated with a one-time session.

Some example embodiments are caused to, include, or otherwise include instructions for verifying the client device is configured to access the verified third-party multi-factor authentication resource.

In some embodiments, verifying the client device is configured to access the verified third-party multi-factor authentication resource includes identifying a target instance identifier associated with the multi-factor sign-in request, identify a confirmation instance identifier, and validate the confirmation instance identifier based on the target instance identifier.

In some embodiments, the target instance identifier includes one from the group including a device identifier, a location associated with the client device, an internet protocol address, and an application identifier. In some embodiments, the confirmation instance identifier includes one from the group including a device identifier, a location associated with the client device, an internet protocol address, and an application identifier.

Some example embodiments are caused to, include, or otherwise include instructions for parsing the multi-factor confirmation message to identify an action notification, and causing the client device, via the multi-app communication system application executed on the client device, to render a multi-app communication system interface associated with the action notification.

In some embodiments, the action notification includes a multi-app communication system action notification indicating a new user action occurred associated with the multi-app communication system, where the multi-app communication system interface is associated with the new user action.

BRIEF DESCRIPTION OF DRAWINGS

FIG. 5 illustrates a flowchart depicting various operations performed in an example process for verifying a third-party resource in accordance with an example embodiment of the present disclosure;

FIG. 6 illustrates a flowchart depicting various operations performed in an example detailed process for verifying a third-party resource via a multi-app communication system in accordance with an example embodiment of the present disclosure; and FIG. 7 illustrates a flowchart depicting various operations performed in an example process for automatically accessing a multi-app communication interface in response to parsing an email message to identify an action notification, in accordance with an example embodiment of the present disclosure.

DETAILED DESCRIPTION

Figure 1:
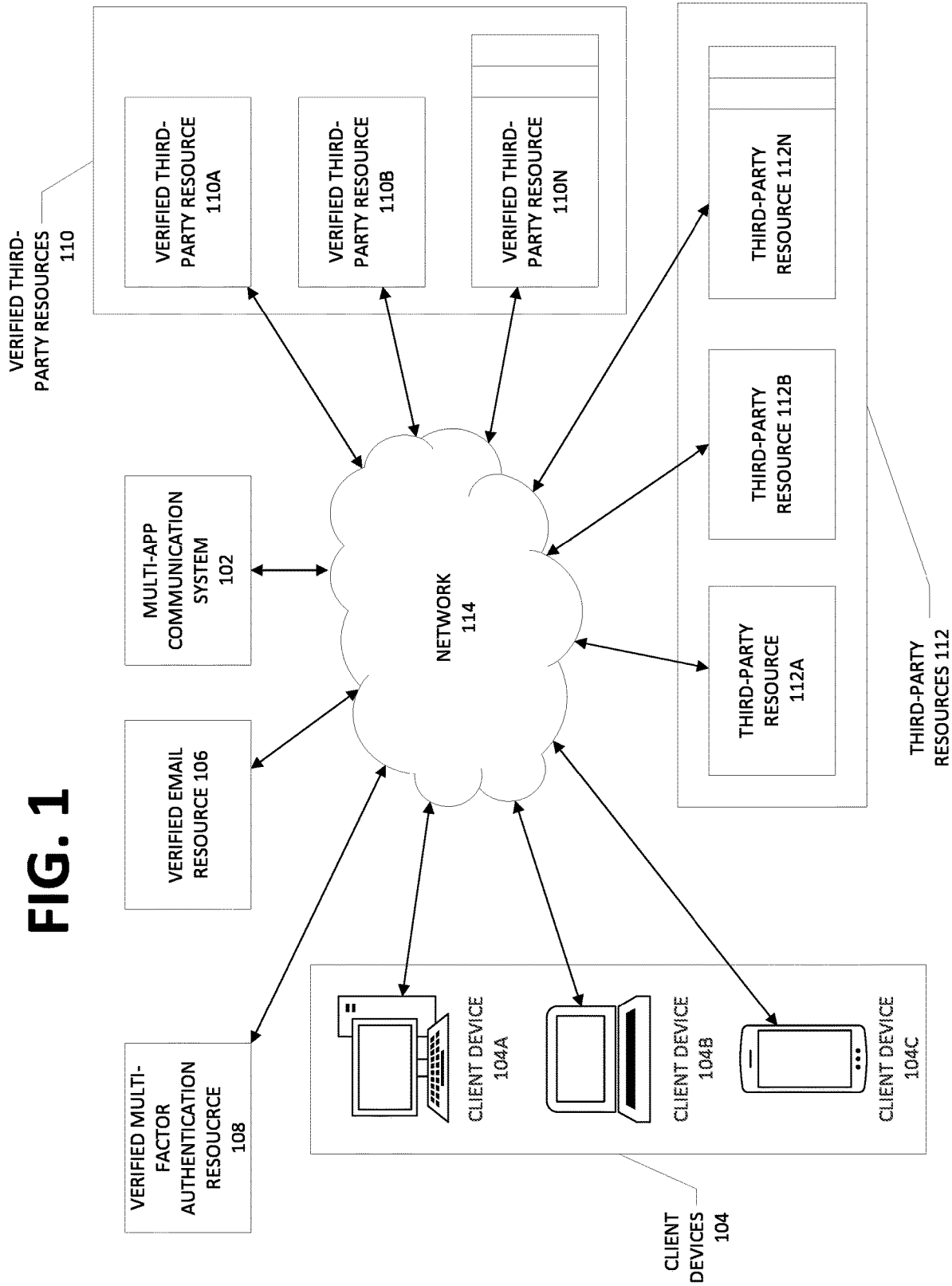
FIG. 1 illustrates a block diagram of a system that may be specially configured, within which embodiments of the present disclosure may operate.

Embodiments of the present disclosure now will be described more fully hereinafter with reference to the accompanying drawings, in which some, but not all, embodiments of the present disclosure are shown. Indeed, embodiments of the present disclosure may be embodied in many different forms, and should not be construed as limited to the embodiments set forth herein; rather, these embodiments are provided so that this disclosure will satisfy applicable legal requirements. Like numbers refer to like elements throughout.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal.

The terms "cause", "causing", and "causes", as used herein, refer to initiating or triggering a series of steps or operations, each of which need not be performed by the initiating entity. For example, in one embodiment, a multi-app communication system causes a third-party resource to validate a multi-factor message code. In some embodiments, an initiating entity causes a second entity to perform one or more operations by transmitting a specially configured request and/or transmission.

The term "user" refers to an individual, group of individuals, business, organization, and/or the like. Users, as referred to herein, are accessing a multi-app communication system using at least one client device executing a multi-app communication system application.

The terms "multi-app communication system", "MAC system", or "MACS" refer to a software platform and associated hardware that is configured to provide, support, and maintain (1) native inter-user communication functionality and (2) managed interoperability with one or more third-party resources. In some embodiments, a MACS is configured to provide a user associated with a particular authenticated user account with authenticated engagement with one or more verified third-party resources. An example MACS provides native functionality associated with, or via, a MACS application (e.g., a group or team based messaging service such as Slack®), and is additionally configured to integrate with and provide authenticated access to various third-party resources (e.g., Asana®, GitHub™, Zendesk®, Google Drive™ Salesforce®, Dropbox®, etc.) through the MACS. A MACS structured in accordance with various embodiments discussed herein is further configured to manage sign-in and authentication operation flows for such service applications of various third-party resources.

The term "multi-app communication system application" refers to a software module and/or combination of hardware and software modules, configured to execute on a client device, to provide information, transactions, or other services associated with a MACS via one or more rendered MACS interfaces. For example, a MACS application may include, but is not limited to, a desktop application, a laptop application, a smart phone application, a personal data assistant application, a web application, or the like. An example MACS application is configured to display one or more MACS interfaces, where the one or more MACS interfaces are configured to enable the MACS native functionality, and functionality associated with one or more verified third-party resources.

The terms "multi-app communication system interface" or "MACS interface" refer to a user interface of a MACS that has security sufficient such that it is accessible only to a defined group of users. For example, a user interface for a Slack® workspace launched for and accessible only to employees of ACME Corporation is an exemplary MACS interface. A MACS may include, or otherwise manage, one or more "MACS interfaces" for supporting and/or connecting multiple specific and separate user groups.

The term "service application" refers to a software module and/or combination of hardware and software modules configured to execute on a client device to provide information, transactions, or other services associated with an application server, to the client device, via one or more rendered user interfaces. For example, a service application may include, but is not limited to, a desktop application, a laptop application, a smart phone application, a personal data assistant application, or the like. A "MACS application," as defined above, is an example of a specific, specially configured service application. A third-party resource may have an associated service application separate from the MACS application.

The terms "user device" or "client device" refers to computer hardware and/or software that is configured to access a MACS application made available by a MACS. Client devices may include, without limitation, smart phones, tablet computers, laptop computers, wearables, personal computers, enterprise computers, and the like. In some example systems, a client device is configured to access an application server via a network.

The term "authenticated session" refers to a validated MACS application instance or access period for communication between client device and a MACS, during which the client device is configured to, via a MACS application, perform or otherwise access specific functionality associated with an authenticated user account via the MACS. In some embodiments, user authentication credentials associated with an authenticated user account are provided to a MACS to launch or initiate an authenticated session associated with the authenticated user account. In some embodiments, during an authenticated session associated with an authenticated user account, a MACS is configured to provide functionality associated with the MACS, and/or one or more verified third-party resources associated with the authenticated user account to a corresponding client device. Additionally, in some embodiments, a MACS is configured to, during an authenticated session associated with an authenticated user account, newly verify a third-party resource associated with the authenticated user account, as described herein, such that a user may access functionality associated with the newly verified third-party resource during an authenticated session associated with the authenticated user account.

An authenticated session is defined by a session open, or launch, and a session end. Additionally, an authenticated session may be associated with additional session information, such as, but not limited to, a session ID number, a user device identifier, associated user authentication data, and/or an associated authenticated user account.

The term "third-party resource" refers to a software program, application, system, platform, or service that is configured to provide one or more services, transactions, and/or information to a client device or client device. The third-party resource operates on a compiled code base, or code repository, that is separate and distinct from that which supports the MACS. In some embodiments, the MACS is configured to communicate with the third-party resource, and vice-versa, through one or more application program interfaces (APIs). In some embodiments, the MACS transmits security tokens and/or other authentication credentials used to facilitate secure communication between the third-party resource and the MACS in view of security layers associated with the multi-app communication network or protocols (e.g., network firewall protocols). Examples of third-party resources include, but are not limited to, Asana®, GitHub™, Zendesk®, Google Drive™, Salesforce®, Dropbox®, and the like.

A third-party resource may be associated with an identifier, such as a "third-party resource identifier," that uniquely identifies the third-party resource. Examples of a third-party resource identifier include a numeric string, an alphanumeric string, an Internet Protocol (IP) address, or the like.

The term "third-party multi-factor authentication resource" refers to a specific third-party resource configured to generate and/or provide a multi-factor confirmation message to a client or client device. For example, the term third-party multi-factor authentication resource comprises an email resource, a text message resource, a chat messaging resource, a SMS resource, and the like. The third-party multi-factor authentication resource operates on a compiled code base, or code repository, that is separate and distinct from that which supports the MACS. In some embodiments, the MACS is configured to communicate with the third-party multi-factor authentication resource, and vice-versa, through one or more application program interfaces (APIs) after the user approves communication between the third-party multi-factor authentication resource and the MACS. In some embodiments, the MACS transmits security tokens and/or other authentication credentials used to facilitate secure communication between the third-party authentication resource and the MACS in view of security layers associated with the multi-app communication network or protocols (e.g., network firewall protocols). Examples of third-party multi-factor authentication resources include, but are not limited to, Microsoft Outlook™ WhatsApp®, and Google Hangouts™.

In some embodiments, a third-party multi-factor authentication resource is an email resource. In some embodiments, a third-party multi-factor authentication resource is a third-party resource configured to provide a multi-factor message code to a client device as a text message or SMS message.

A third-party multi-factor authentication resource may be associated with a "third-party multi-factor authentication resource identifier" that uniquely identifies the third-party multi-factor authentication resource. Examples of a multi-factor authentication resource include a numeric string, an alphanumeric string, an Internet Protocol (IP) address, or the like.

Some third-party multi-factor authentication resources provide functionality solely associated with providing and/or generating multi-factor confirmation messages and/or corresponding multi-factor message codes. Other third-party multi-factor authentication resources additionally perform functionality separate from the providing and/or generating of a multi-factor confirmation message and/or multi-factor message code, and thus function as a third-party resource and multi-factor authentication resource. In other words, some multi-factor authentication resources provide functionality both for providing and/or generating of multi-factor confirmation messages and/or multi-factor message codes, and functionality not associated with such actions. A verified email resource, as defined below, is an example of a third-party resource configured to provide more than just multi-factor third-party authentication resource functionality.

The term "sign-in request" refers generally to information or data, transmitted from a client device to a MACS, that indicates a user desire to launch an authenticated session associated with a MACS or a verified third-party resource associated with the MACS. A sign-in request may be received in response to user engagement with a sign-in prompt interface, such as a sign-in prompt interface rendered to a client device via a MACS application.

A sign-in request associated with accessing MACS functionality provided by a MACS, for example a sign-in request sent before a user has been successfully authenticated by a MACS, may be referred to as a "multi-app sign-in request." In some embodiments, a multi-app sign-in request is received in response to user engagement with "a multi-app sign-in prompt interface" associated with the MACS application. In some embodiments, a multi-app sign-in prompt interface is configured to receive user authentication credentials associated with the MACS.

A sign-in request associated with accessing third-party resource functionality via a MACS, for example a sign-in request sent after a user has been successfully authenticated by a MACS associated with a verified third-party resource (e.g., during an authenticated session associated with the MACS), may be referred to as a "third-party resource sign-in request." In some embodiments, a third-party resource sign-in request is received in response to user engagement with "a third-party resource sign-in prompt interface" associated with a MACS application executed on a user device. In some embodiments, a third-party resource sign-in prompt interface is configured to receive user authentication credentials associated with the third-party resource. Alternatively, in some embodiments, a third-party sign-in request is received automatically upon user initiation of a MACS application, or initiation of a verified third-party resource.

It should be appreciated that while the phrase "third-party resource sign-in request" may be used to differentiate from a "multi-app sign-in request," both a "multi-app sign-in request" and a "third-party resource sign-in request" may be referred to in reference to the term "sign-in request" generally.

The term "third-party resource integration request" refers to information and/or data, received from a client device by a MACS, indicating a user selected an unverified third-party resource associated with the MACS to verify in association with the user, such that the MACS is configured to provide functionality associated with the third-party resource.

The term "third-party resource access request" refers to information and/or data transmitted by a MACS, to a client device, requesting user permission, associated with an authenticated user account, for the MACS to communicate with, or access, a third-party resource on behalf of the authenticated user account. The term "third-party resource access response" refers to information received by a MACS, from a client device, that indicates approval or rejection, by the user, of a third-party resource access request. The term "third-party resource access approval" refers specifically to a third-party resource access response that indicates a user approved the MACS to communication with, or access, the third-party resource associated with an authenticated user account.

In some embodiments, a third-party resource access request is configured to cause a client device to render, via a corresponding service application executed on the client device, a "third-party resource access prompt interface." Accordingly, in some embodiments, a MACS receives a third-party resource access response in response to user engagement with a third-party resource access prompt interface, or a component thereof, rendered via the client device. An example third-party resource access prompt interface comprises a resource access message. The resource access message comprises texts, images, and/or other data indicating to the user the third-party resource to be accessed, and that the MACS is requesting permission to integrate with the third-party resource. The third-party resource access prompt interface, in some embodiments, comprises a confirmation button indicating approval of the third-party resource access request and configured to transmit a third-party resource access approval to the MACS in response to user engagement. Additionally or alternatively, in some embodiments, the third-party resource access prompt interface comprises a cancellation button indicating rejection of the third-party resource access request and configured to transmit a third-party resource access rejection to the MACS in response to user engagement.

In some embodiments, a third-party multi-factor authentication resource similarly requires the integration and sign-in process described in the definitions above. The terms "third-party multi-factor authentication resource access request", "third-party multi-factor authentication resource access response", "third-party multi-factor authentication resource access approval", and "third-party multi-factor authentication resource access prompt interface", refer to information as defined by the corresponding terms above with respect to a third-party resource where the third-party resource is specifically a third-party multi-factor authentication resource.

The term "verified" refers to a state of authorized communication between a MACS and a third-party resource, such that a MACS is configured to provide functionality associated with the third-party resource during an associated session associated with the authenticated user account. In some embodiments, a MACS is configured to communicate with a verified third-party resource on behalf of an authenticated user account associated with a current authenticated session associated with the MACS. Accordingly, during an authenticated session associated with a third-party resource, a MACS is configured to access functionality of the third-party resource associated with an authenticated user account.

The term "authentication link" refers to an accessible element configured to, upon user engagement, provide authenticated access associated with a MACS or verified third-party resource. In some embodiments, an authentication link comprises one or more link parameters for use in user authentication by the MACS.

The term "multi-factor message code" refers to a unique code, numeric string, alphanumeric string, or other machine, and/or human, interpretable string configured to provide additional security associated with a client device and/or user profile. In an example embodiment, a multi-factor message code comprises a numeric code having a set length. In some embodiments, a multi-factor message code is included in an access link, for example an authentication link including a multi-factor message code as a link parameter.

The term "multi-factor confirmation message" refers to an electronic message, notification, or other transmission, provided by a third-party multi-factor authentication resource, that comprises a multi-factor message code utilized for securely authenticating with a MACS, or third-party resource. A multi-factor confirmation message may be associated with accessing a MACS, or with accessing a third-party resource via a MACS. In an example embodiment, a multi-factor confirmation message comprises an email message comprising a multi-factor message code associated with accessing a MACS or a third-party resource via a MACS. In another example embodiment, a multi-factor confirmation message is an email message including an authentication link associated with accessing a MACS, or a third-party resource via a MACS, where the authentication link comprises a multi-factor message code.

The term "email resource" refers to a third-party resource configured to provide electronic mailing services, messages, and/or the like to a client device. The term "verified email resource" refers to an email resource for which a given user granted access to a MACS to access, read, and/or otherwise parse data and/or information associated with the email resource, during an authenticated session associated with the verified email resource as described herein. In a particular embodiment, a verified email resource is configured to function as a verified third-party multi-factor authentication resource, for example by providing a multi-factor confirmation message in the form of an email message, to a corresponding email address, such that the email multi-factor confirmation message can be read, parsed, or accessed by a MACS. Additionally or alternatively, in some embodiments, an email resource is configured to provide functionality additional and/or alternative to the generation and/or transmittal of one or more multi-factor messages. In an example embodiment, utilizing a multi-factor authentication resource access prompt interface, a user permissions and authenticates a MACS to access an email resource, and thus that email resource may be referred to as a "verified email resource".

The email resource comprises an email client (i.e., a service application of the email resource), a simple mail transfer protocol ("SMTP") server, and a domain name server ("DNS"). The email resource is configured to allow a sending user ("a sender") to create and transmit an email message to a receiving user ("a recipient"). Each email message comprises an email envelope that defines its electronic format, an email header that comprises sender/recipient information and an email subject line, and an email body that comprises text, images, and file attachments. The email resource operates on a compiled code base or repository that is separate and distinct from that which supports the MACS. Example email resources include Microsoft Office 365®, Microsoft Outlook™, Gmail®, and Yahoo Mail®.

An email client of the email resource may be used by a sender to create and transmit an email message. The email message text and attachments are thus uploaded to the SMTP server as outgoing mail. A copy of the email message is stored to an email outbox associated with the sender for later retrieval. The SMTP server communicates with the DNS to find a recipient email server using recipient information drawn from the email header. Once the SMTP server finds the recipient email server, it transfers the email message to the recipient email server. The next time the recipient accesses the email client, the email client downloads the email message from the recipient email server for presentation to the recipient in an email inbox interface.

The term "multi-factor request" refers to information or data, transmitted by a MACS, configured to cause a multi-factor confirmation message to be provided by a multi-factor authentication resource. In a particular embodiment, a multi-factor request causes a verified email resource to provide a multi-factor confirmation message in the form of a multi-factor confirmation email. In an example embodiment, a MACS transmits a multi-factor request to the verified email resource, where the multi-factor request comprises a multi-factor confirmation email message including a multi-factor message code, and/or a state, that the MACS is configured to correlate to the event that generated the multi-factor request (e.g., a sign-in request submitted by a user). In another example, a MACS causes the third-party resource to transmit a multi-factor request to the verified email resource, such as by transmitting a multi-factor request to the third-party resource.

The term "in-app auto-authentication prompt interface" refers to data, information, and/or a user interface, presented by a MACS via a MACS application, in response to successful validation, by the MACS, of a message confirmation code. In some embodiments, the in-app auto-authentication prompt interface is configured to receive user engagement indicating the user has approved, or revoked, a launched authenticated session initiated using automatic multi-factor message code validation as described herein, without the user closing or otherwise leaving the MACS application associated with the MACS. In some embodiments, an in-app auto-authentication prompt interface is rendered to one or more client devices associated with an authenticated user account different from the client device that successfully enabled access to the MACS or a third-party resource.

The term "in-app auto-authentication approval" refers to data and/or information received in response to user engagement with an in-app auto-authentication prompt interface granting authenticated access to the MACS associated with the MACS for an authenticated session. In some embodiments, an in-app auto-authentication approval received in response to user engagement with the in-app auto-authentication prompt interface, or a component therein, such as an "Okay" or other confirmation button, rendered to a client device via a MACS application associated with a MACS.

The term "in-app auto-authentication revocation" refers to data and/or information received in response to user engagement with an in-app auto authentication prompt interface denying or revoking authenticated access associated with a MACS, or verified third-party resource via a MACS. Some embodiments receive an in-app auto-authentication revocation in response to user engagement with the in-app auto-authentication prompt interface, or a component therein, such as a "Revoke access" button or other access denial button, rendered to a client device via a MACS application associated with a MACS.

The term "instance identifier" refers to information and/or data that comprises an identifier that uniquely identifies a particular MACS application instance or client device. Examples of instance identifiers include, but are not limited to, a device identifier, an international manufacturer equipment identity, a client device location, user profile identifier, Internet Protocol address, MACS application identification number, application instance number, or other identifier. In some embodiments, an instance identifier is determined through device management software operating on a client device, for example mobile-device management software. In some embodiments, a client device location is used to determine if the client device is located within a trusted proximity associated with an authenticated user account.

The term "target instance identifier" refers to a specific instance identifier associated with a sign-in request received by a MACS. In some embodiments, a MACS receives a sign-in request that comprises a target instance identifier associated with the user profile and/or client device transmitting the sign-in request. In other embodiments, a MACS determines a target instance identifier associated with a received sign-in request.

The term "confirmation instance identifier" refers to a specific instance identifier associated with an identified multi-factor confirmation message that is read, parsed, or accessed by a MACS. In some embodiments, a MACS is configured to identify a confirmation instance identifier that associated with a client device or MACS application instance that has access to an identified multi-factor confirmation message. In other embodiments, a multi-factor confirmation message comprises a confirmation instance identifier, and a MACS is configured to extract the confirmation instance identifier from the multi-factor confirmation message.

The term "one-time session" refers to authenticated access to functionality, via a MACS, during a specified period. In some embodiments, a one-time session continues for a pre-defined time period. In other embodiments, a one-time session continues until a user signs-off. In some embodiments, a one-time session is associated with an authenticated user account. Accordingly, during a one-time session, a user may access functionality natively associated with the MACS, or functionality associated with one or more verified third-party resources. In some embodiments, a multi-factor message code is specially configured to be a limited multi-factor message code, which causes only one-time access to the MACS or third-party resource. In some embodiments, a limited multi-factor message code is configured to provide a one-time session without entry of user credentials.

The term "action notification" refers to a message, transmission, or text included in a message or other transmission, to a client device that comprises information associated with user activity in a particular MACS interface. For example, an action notification may be an email message, or portion of an email message, provided by a verified email resource that is accessible to the MACS. The term "third-party resource action notification" refers specifically to a MACS action notification that indicates user activity associated with a third-party resource of a particular MACS interface.

Overview

Privacy concerns and software licensing restrictions cause a third-party resource to require user account authentication before access is provided to functionality associated with the third-party resource. A third-party resource may, for example, require entry of user credentials (e.g., username and password) in an effort to confirm that a user attempting to access the third-party resource is actually authorized to receive such access. However, input of user credentials alone has proven ineffective for mitigating risks associated with hackers and malicious actors. Two-factor authentication protocols are used to alleviate such risks by utilizing a separate channel, band, device, or other communication method, to validate or authenticate a user. Two-factor authentication operates on the premise that a user requesting access to a third-party resource that has access both to valid user credentials and a secondary, separate, trusted communication channel or device, should be an authorized user.

Various embodiments of the disclosure relate to a MACS (e.g., Slack®) configured to automatically validate multi-factor confirmation messages, without direct user engagement commonly associated with two-factor authentication, to verify a third-party resource (e.g., Asana™) during an authenticated session associated with an authenticated user account, or to launch an authenticated session associated with the MACS. An example MACS is configured to, after receiving user permission to access a third-party resource, such as a third-party multi-factor authentication resource, retrieve a multi-factor confirmation message (e.g., an email confirmation message received to a Gmail® account), extract a multi-factor message code from the multi-factor confirmation message, and validate the multi-factor message code to launch an authenticated session associated with a validated user account of the third-party resource (Asana™ in this example).

Some embodiments of the present disclosure are configured to receive a sign-in request from a user device, cause a verified third-party multi-factor authentication resource to provide a multi-factor confirmation message, query the verified third-party multi-factor authentication resource to identify the multi-factor confirmation message, extract a multi-factor message code from the multi-factor confirmation message, validate the multi-factor message code is associated with an authenticated user account, and enable access via the MACS to functionality associated with the sign-in request. For example, the MACS may launch an authenticated session associated with the authenticated user account, such that the user may (1) access functionality associated with the MACS and/or one or more verified third-party resources, or (2) verify third-party resources as described herein to access their functionality. The MACS may also enable access to a third-party resource, for example by associating the third-party resource as verified for an authenticated user account and storing authentication information associated with the newly verified third-party resource. For example, the MACS may store an third-party resource authentication token associated with the newly verified third-party resource.

Embodiments of the present disclosure enhance user security while also enhancing overall system efficiency and usability. By utilizing multi-factor message codes provided by a verified third-party multi-factor authentication resource, example systems enhance user security over traditional use of username and password. Furthermore, by retrieving the multi-factor code automatically from the verified third-party multi-factor authentication resource, embodiments of the present disclosure eliminate opportunities for user error, or associated technical error, with manually retrieving a multi-factor code from a third-party multi-factor authentication resource, such as by accessing a separate service application associated with the third-party multi-factor authentication resource. This feature is particularly important for MACS environments where two-factor authentication may be required to link a single user account with dozens or third-party resources.

Various embodiments of the present disclosure also advantageously enable the launch of various authenticated sessions (e.g., validated third-party resource sessions) without leaving an associated MACS application interface. Accordingly, embodiments of the present disclosure improve system usability and overall user experience associated with the system, as the user utilizing a MACS application may begin and complete authentication without closing, terminating, leaving, or otherwise navigating away from the associated MACS application.

Technical Underpinnings

A MACS facilitates communication between one or more user groups, and integrates with one or more third-party resources to provide additional functionality associated with the one or more third-party resources. In a particular embodiment, the user groups are securely grouped, and segmented via separate MACS interfaces, where each MACS interface is configured to allow a given user to communicate with other users in the particular group via the corresponding MACS interface. For example, a user interface for a Slack® workspace launched for and accessible only to employees of ACME Corporation is an exemplary MACS interface.

An embodiment MACS is associated with multiple third-party resources. These third-party resources, for example, are configured to integrate with the MACS, such that the MACS may provide functionality associated with the third-party resource to a particular user, user group, or particular MACS interface. As a particular example, a first third-party resource may provide task-management functionality, a second third-party resource may provide calendaring functionality, a third third-party resource may provide video conferencing functionality, and a fourth third-party resource may provide document sharing functionality. It should be appreciated that these are merely examples of third-party resources, and a third-party resource may exist to provide any functionality associated with the third-party software, via the MACS.

Each authenticated user account associated with the MACS may similarly be associated with one or more verified third-party resources. A user may verify a third-party resource associated with the MACS such that, when the user accesses the MACS for an authenticated session associated with the authenticated user account, the user has enabled the MACS to access and provide functionality associated with the third-party resource. The MACS may store information, such as a flag or other indicator, for identifying verified third-party resources associated with a particular authenticated user account. Alternatively or additionally, the MACS may store verification information for accessing information associated with the authenticated user account via the verified third-party resource, for example a third-party resource authentication token specifically associated with the verified third-party resource and/or the authenticated user account.

A user accessing a MACS through a MACS application must authenticate their identity with the MACS. In some embodiments, a MACS receives user authentication credentials from a client device, and/or additional information associated with the client device or user to be authenticated. The MACS may identify an authenticated user account associated with the received user authentication credentials, and launch an authenticated session associated with the authenticated user account. Accordingly, during the authenticated session, the user may access functionality associated with the MACS or functionality associated with their verified third-party resources, via the MACS application executed on the client device. Additionally or alternatively, the user may newly verify a third-party resource, as described herein. After a third-party resource becomes a verified third-party resource, the MACS is enabled to provide functionality associated with the verified third-party resource during the authenticated session associated with the authenticated user account. In some embodiments, information may be stored that associates the verified status of the third-party resource with the authenticated user account, such that if the MACS later launches another, or a new, authenticated session associated with the authenticated user account, the user may still access functionality associated with the newly verified third-party resource.

An example MACS may be associated with tens, hundreds, thousands, or more, of third-party resources. An example MACS is configured to function as, or associated with, an third-party resource store, third-party application store, or third-party integrations store. When a user authenticates with a MACS, such that the MACS initiates an authenticated session associated with the MACS for a particular authenticated user account, the user may browse, and subsequently select for use, a third-party resource. Accordingly, the MACS system may request permission to access the selected third-party resource, and after receiving approval/permission from the user, MACS may be configured to communicate with the third-party resource on behalf of the user, group, or MACS interface. Accordingly, once a MACS system is integrated with a third-party resource such that the MACS system can communicate with the third-party resource to provide functionality associated with the third-party resource on the behalf of the user, the third-party resource may be referred to as a "verified third-party resource."

A verified third-party resource may be associated with an authenticated user account. Accordingly, whenever a MACS launches an authenticated session associated with the authenticated user account, such as when a user signs-in to the MACS via a MACS application executed on a client device, the user may access functionality associated with the verified third-party resource.

One or more third-party resources may be specially configured to perform multi-factor authentication, and/or otherwise generate and/or provide a multi-factor confirmation code associated with a sign-in process. These third-party resources may specifically be referred to as "third-party multi-factor authentication resources," to differentiate such resources from other third-party resources that lack such functionality. An example embodiment MACS communicates with a third-party multi-factor authentication resource to cause the third-party multi-factor authentication resource to provide a multi-factor confirmation message, identify the multi-factor confirmation message utilizing the third-party multi-factor authentication resource (such as by querying the multi-factor authentication resource), extract a multi-factor message code from the multi-factor confirmation message, and validate, or otherwise cause validation of, the extracted multi-factor message code. In such a configuration, the integrated nature of communications between the MACS and the third-party multi-factor authentication resource enables the efficient, enhanced, and automatic validating of one or more multi-factor message code.

Multi-factor message codes may be associated with multi-factor authentication associated with signing in to access the MACS itself, or to multi-factor authentication associated with signing in to access another verified third-party resource. For example, if a user grants access to a third-party multi-factor authentication resource, the now-verified third-party multi-factor authentication resource may receive a multi-factor confirmation message when the user attempts to access the MACS for an authenticated session, or when the user attempts to access a verified third-party resource for an authenticated session. Advantageously, an embodiment MACS is configured to identify a multi-factor confirmation message and subsequently parse to identify and/or validate a multi-factor message code within the multi-factor confirmation message. Thus, embodiment systems enhance security associated with accessing third-party resources through a MACS. Embodiment systems additionally enhance overall system efficiency by enabling a MACS to perform user authentication, including multi-factor authentication, automatically. Further, embodiment systems additionally enhance user experience associated with user authentication, as the user need not perform excess steps relating to multi-factor authentication, is not vulnerable to possible technical or user errors in performing such excess steps, and instead may remain entirely within a MACS application during the user authentication process.

It should be appreciated that, in some embodiments, multiple multi-factor confirmation messages may be sent, and multiple corresponding multi-factor message codes may be validated. In some embodiments, a single verified multi-factor authentication resource may provide multiple multi-factor confirmation messages. Additionally or alternatively, in some embodiments, multiple verified multi-factor authentication resources may each provide one or more multi-factor confirmation messages. An embodiment MACS may be configured to validate various multi-factor confirmation codes provided by various multi-factor authentication resources. For example, a MACS may validate a first multi-factor message code extracted from a multi-factor confirmation email message provided via a verified email resource, and a second multi-factor message code extracted from a multi-factor confirmation text message provided via a verified messaging resource. Accordingly, embodiments of the present disclosure further improve system efficiency and user experience.

In one example embodiment, an email resource, configured to generate and/or provide email messages, is verified and functions as a verified third-party multi-factor authentication resource. A user may integrate and verify an email resource with the MACS, and associate the now verified email resource with a specific authenticated user account, such that the MACS may access one or more email messages associated with a user email profile associated with the particular authenticated user account (e.g., email messages sent to a particular email profile associated with the verified email resource, where the particular email profile is associated with the user of the MACS) during an authenticated session associated with the authenticated user account. When a user subsequently attempts to sign-in to the MACS, or newly verify a third-party resource via the MACS, with multi-factor authentication enabled, a multi-factor confirmation message may be received via the verified email resource. The MACS may query the verified email resource to identify the multi-factor confirmation email, and subsequently utilize the email to verify, or complete verification of, the third-party resource, or launch an authenticated session associated with the MACS.

Additionally, a MACS configured to access a verified third-party resource, such as a verified email resource, may identify action notifications associated with one or more other verified third-party resources. For example, when a third-party user performs an action associated with a verified third-party resource, an email message including an action notification may be provided, via a verified email resource, to a user associated with the performed action. A MACS configured to communicate with the verified email resource may identify these email messages including an action notification, and subsequently may identify a MACS interface associated with the action notification and/or cause a corresponding client device to render the MACS interface associated with the action notification.

By accessing the verified email resource to identify action notifications, embodiment MACS improve system efficiency by automatically presenting user interfaces that are relevant to the user. Additionally or alternatively, this functionality may be combined with the automatic multi-factor authentication described herein, such that users may, upon sign-in, navigate to a relevant MACS interface without unnecessarily engaging further with the MACS.

System Architecture

FIG. 1 is a block diagram showing an exemplary system within which embodiments of the present disclosure may operate. For example, the illustrated exemplary system comprises MACS 102, client devices 104 (specifically, client devices 104A-104C), verified email resource 106, verified multi-factor authentication resource 108, verified third-party resources 110 (specifically, verified third-party resources 110A-110C), and third-party resources 112 (specifically, third-party resources 112A-112C). The each of these devices and/or systems are configured to communicate via a network, specifically network 114.

The third-party resources 112 include various third-party systems, devices, and/or computing apparatuses configured to provide third-party functionality associated with the third-party resource to the MACS 102, and on behalf of a user associated with one or more of the client devices 104, upon verification associated with a particular authenticated user account. The third-party resources 112, as illustrated, may be integrated and verified associated with a particular authenticated user account, but are not yet integrated and verified with respect to a particular authenticated user account as illustrated. Accordingly, while MACS 102 is configured to communicate with the third-party resources 112 for purposes of verification, in some embodiments, the MACS 102 is not permissioned nor configured to communicate with the third-party resources 112 on behalf of, or otherwise for information associated with, an authenticated user account. The MACS 102 may communicate with one or more of the third-party resources 112 via one or more APIs.

The verified third-party resources 110 may be embodied by various third-party systems, devices, and/or computing apparatuses configured, integrated, permissioned, and otherwise verified as described herein, to provide third-party functionality associated with the third-party resource to the MACS 102 on behalf of a user. A user may, during an authenticated session associated with an authenticated user account, integrate and verify several verified third-party resources, such that functionality associated with each verified third-party resource is accessible during an authenticated session associated with the authenticated user account. The verified status of each verified third-party resource may be stored by the MACS such that the MACS can identify verified third-party resources associated with each authenticated user account. For example, a first authenticated user account (e.g., authenticated user account "JaneDoe") may have verified the verified third-party resources 110A-110N, as illustrated, such that during an authenticated session associated with the first authenticated user account, functionality associated with each of the verified third-party resources 110A-110N is accessible via the MACS, such as through a MACS application executed on the client device. A second authenticated user account (e.g., authenticated user account "JohnDoe") may have verified the verified third-party resources 110A and 110B only, such that during an authenticated session associated with the second authenticated user account, functionality associated with only these verified third-party resources (110A and 110B) is accessible via the MACS. Accordingly, the MACS 102 may provide functionality associated with each of the verified third-party resources 110 to one or more of the client devices 104. The MACS 102 may communicate with one or more of the verified third-party resources 110 via one or more APIs.

The verified multi-factor authentication resource 108 may be embodied by a system, device, and/or computing apparatus configured, integrated, and permissioned to provide one or more multi-factor confirmation messages to one or more of the client devices 104. The verified multi-factor authentication resource 108 is integrated and permission to communicate with MACS 102. For example, MACS 102 may communicate with verified multi-factor authentication resource 108 to generate and provide a multi-factor confirmation message including a multi-factor message code. The MACS 102 may then query the verified multi-factor authentication resource 108 to identify the multi-factor confirmation message, and extract the multi-factor message code, which the MACS 102 may then utilize to authenticate the user and initiate an authenticated session. The MACS 102 may communicate with the verified multi-factor authentication resource 108 via one or more APIs.

Verified email resource 106 may be embodied by a third-party system, device, and/or computer apparatus configured, to provide email reading, creating, and related functionality via the MACS 102, and verified as described herein. Additionally, verified email resource 106 may function as a verified third-party multi-factor authentication resource, such as by generating and/or providing one or more multi-factor confirmation messages accessible to MACS 102. The MACS 102 may communicate with the verified email resource 106 via one or more APIs.

Client devices 104 may be embodied by various user devices, systems, computing apparatuses, and the like. For example client device 104A may be a desktop computer for the particular user, while client device 104B may be a laptop computer for the particular user, and client device 104C may be a smartphone device for the particular user. Each of the client devices 104 may be configured to communicate with the MACS 102, for example through a MACS application installed and/or executed on the client device. For example, the user may execute a MACS desktop application on the client device 104A, which is configured to communicate with the MACS 102.

The MACS 102 may be embodied by one or more specially configured systems, servers, networked devices, computer apparatuses, and/or the like. The MACS 102 is configured to provide functionality to one or more of the client devices 104 over a network, such as network 114. Each client device may execute a MACS application on the user device in order to communicate with MACS 102. In an example embodiment, the MACS application executed on the client device may function in a browser application installed on the client device. In another example embodiment, the MACS application executed on the client device may function as a separately installed application installed on the client device.

The functionality provided to a client device, such as client device 104A, through MACS 102, comprises native functionality provided by the MACS 102. In other words, the MACS 102 is configured to provide some functionality without communication with any verified third party resources. In particular, MACS 102 is configured to facilitate communication between users, or groups of users, via one or more specially configured MACS interfaces. Without integration with any third-party resources, a user operating a client device, such as client device 104A, may communicate, via a MACS application, with the MACS 102 to utilize such functionality.

Through a MACS application, MACS 102 may communicate with a client device, such as client device 104A, to receive engagement, data, or other information from a user associated with the client device 104A, and/or render information for display to the user associated with the client device 104A. For example, client device 104A may transmit one or more requests and/or responses to MACS 102 in response to user engagement with, or user navigation associated with, one or more interfaces rendered to the client device 104A via a MACS application executed on the client device 104A. In particular, a client device 104A may transmit a third-party sign-in request, a third-party resource integration request, a third-party access response, a third-party multi-factor authentication resource access response, and/or an in-app auto-authentication response.

Additionally, MACS 102 may provide, to one or more of the client devices 104, functionality associated with one or more of the verified third-party resources 110, in addition to the native functionality provided by MACS 102. For example, verified third-party resource 110A may be associated with document storage and sharing, verified third-party resource 110B, may be associated with video conferencing, and verified third-party resource 110N may be associated with task management for a group of users. MACS 102 may be configured to communicate with the verified third-party resources 110A, 110B, and 110N, to provide functionality to one or more client devices, for example to client device 104A, through a MACS application executed on the client device. Accordingly, after a user has integrated and permissioned, or otherwise verified, one or more verified third-party resources (e.g., verified third-party resources 110), MACS 102 may communicate with the one or more verified third-party resources 110, such as through one or more APIs associated with each verified third-party resource to access and provide functionality for all verified third-party resources 110 through the single MACS application executed on a client device.

In some embodiments, MACS 102 may utilize a verified multi-factor authentication resource, such as verified multi-factor authentication resource 108 or verified email resource 106, to perform multi-factor authentication related during an authentication process for signing into MACS 102, or one of the verified third-party resources 110. MACS 102 may be configured to require the user undergo an authentication process before the MACS 102 will initiate an authenticated session, during which the user may access native functionality of the MACS 102, integrate new third-party resources 112, and/or authenticate with and access functionality associated with the verified third-party resources 110. An example authentication process may include a primary authentication method, for example the MACS 102 may request the user provide user authentication credentials, such as a username and password, to the MACS 102 via a MACS application executed on the client device, for example client device 104A. After successfully completing a primary authentication method, the MACS 102 may require one or more additional authentication methods before initiating an authenticated session.

Using verified email resource 106 as an example, MACS 102 cause verified email resource 106 to provide a multi-factor confirmation message upon receiving a sign-in request, and/or determining the user associated with a client device, such as client device 104A, completed a primary, or subsequent, authentication method. For example, the MACS may identify a particular authenticated user account associated with the user authentication credentials provided by the user, and also may identify an email profile associated with the particular user account. In a particular example, MACS 102 may generate an email multi-factor confirmation message, and transmit, to the verified multi-factor authentication resource, a multi-factor request including the email multi-factor confirmation message. The verified email resource may then provide the email multi-factor confirmation message by making the verified email resource available to the identified email profile associated with the user account. Accordingly, the MACS 102 may query the verified email resource 106 to determine if the user associated with the client device has access to the email confirmation message. If the user does, the MACS 102 may receive, or retrieve, the email confirmation message, parse the email confirmation message to identify a multi-factor confirmation code, and verify the multi-factor confirmation code. Subsequently, the MACS 102 may initiate an authenticated session associated with the MACS 102, such that the client device 104A may access the MACS during the authenticated session via the MACS application executed on the client device 104A.

Each client device may be associated with one or more identifiers, such as a device identifier, IP address, international mobile equipment identity (IMEI) number, or the like. Additionally or alternatively, a MACS application executed on a client device may be associated with one or more identifiers, such as an application identifier, application instance identifier, or the like. A client device may transmit one or more identifiers associated with the client device and/or one or more identifiers associated with the MACS application as part of all, or some, data/information transmissions sent to MACS 102. The MACS may parse received data and extract the device/MACS application identifiers for use in verifying that the client device requesting sign-in has access to a multi-factor confirmation message sent via a verified multi-factor authentication resource, such as verified multi-factor authentication resource 108 and/or verified email resource 106.

In some embodiments, MACS 102 may utilize a verified multi-factor authentication resource, such as verified multi-factor authentication resource 108 and/or verified email resource 106, to facilitate verification for the one or more third-party resources 1122. For example, a user may verify third-party resource 112A with MACS 102, such that MACS 102 can communicate with, such as to provide functionality associated with, third-party resource 112A, for example through one or more APIs. MACS 102 may facilitate authentication for third-party resource 112A, such that the user must undergo a primary authentication method associated with the third-party application 112A and subsequent multi-factor authentication without user engagement, as described herein, before the MACS 102 considers the third-party resource 112A verified, and is configured to enable access to the third-party resource during an authenticated session associated with an authenticated user account.

During an authenticated session associated with an authenticated user account, MACS 102 may receive a third-party resource sign-in request including user authentication credentials. MACS 102 may, via communication with third-party resource 112A, identify an authenticated user account associated with the third-party resource 112A. In other embodiments, MACS 102 may automatically identify an authenticated user account associated with the third-party resource 112A. Subsequently, MACS 102 may determine the third-party resource requires additional authentication (e.g., multi-factor authentication) associated with the identified authenticated user account, such as through verified email resource 106. In some embodiments, the MACS 102 generates a multi-factor confirmation message, and transmits it to the verified email resource 106, such that the verified email resource 106 may provide the multi-factor confirmation message. In other embodiments, the third-party resource 112A, or MACS 102, may cause generation and/or providing of the multi-factor confirmation message.

The MACS 102 may then identify the multi-factor message associated with the third-party resource. For example, the MACS 102 may query the verified email resource 106 to identify the multi-factor confirmation message, and receive the multi-factor confirmation message in return. The MACS 102 may then be configured to parse the multi-factor confirmation message to identify a multi-factor message code, and verify the multi-factor message code. Finally, the MACS 102 may enable access to the third-party resource 112A, for example by transmitting an authentication success indication, the multi-factor message code, or the like, to the third-party resource, indicating that multi-factor authentication was completed successfully. In some embodiments, the MACS 102 may receive information for enabling access with the third-party resource 112A in return, such as an authentication token. The MACS 102, in some embodiments, may store the access information associated with an authenticated user account.

Although depicted with verified third-party resources 110A, 110B, and 110N, it should be appreciated that any number of verified third-party resources may be associated with MACS 102. Additionally, for each user, the verified third-party resources 110 may be different. MACS 102 may be configured to determine the set of verified third-party resources for a given user based on one or more third-party resource identifiers. The verified third-party resources that may be associated with a MACS are not limited to the verified third-party resources 110A, 110B, and 110N, as depicted and as described above.

Similarly, although depicted with third-party resources 112A, 112B, and 112N, it should be appreciated that any number of third party resources may be associated with MACS 102. For example, a MACS 102 may be associated with tens, hundreds, thousands, or more, of third-party resources, which users may integrate with and access functionality through MACS 102. The third-party resources that may be associated with a MACS are not limited to the third-party resources 112A, 112B, and 112N, as depicted and as described above.

Similarly, it should be appreciated that any number and type of client device may be associated with a MACS. In some embodiments, a user may only be associated with a single client device. In other embodiments, a user may be associated with multiple user devices of different types, including, in some embodiments, multiple user devices of the same type (e.g., two desktop computers). It should be appreciated that alternative or additional client devices may be associated with a MACS within embodiment systems herein. Accordingly, the client devices associated with a MACS are not limited to the client devices 104A, 104B, and 104C as depicted and as described above.

Figure 2:
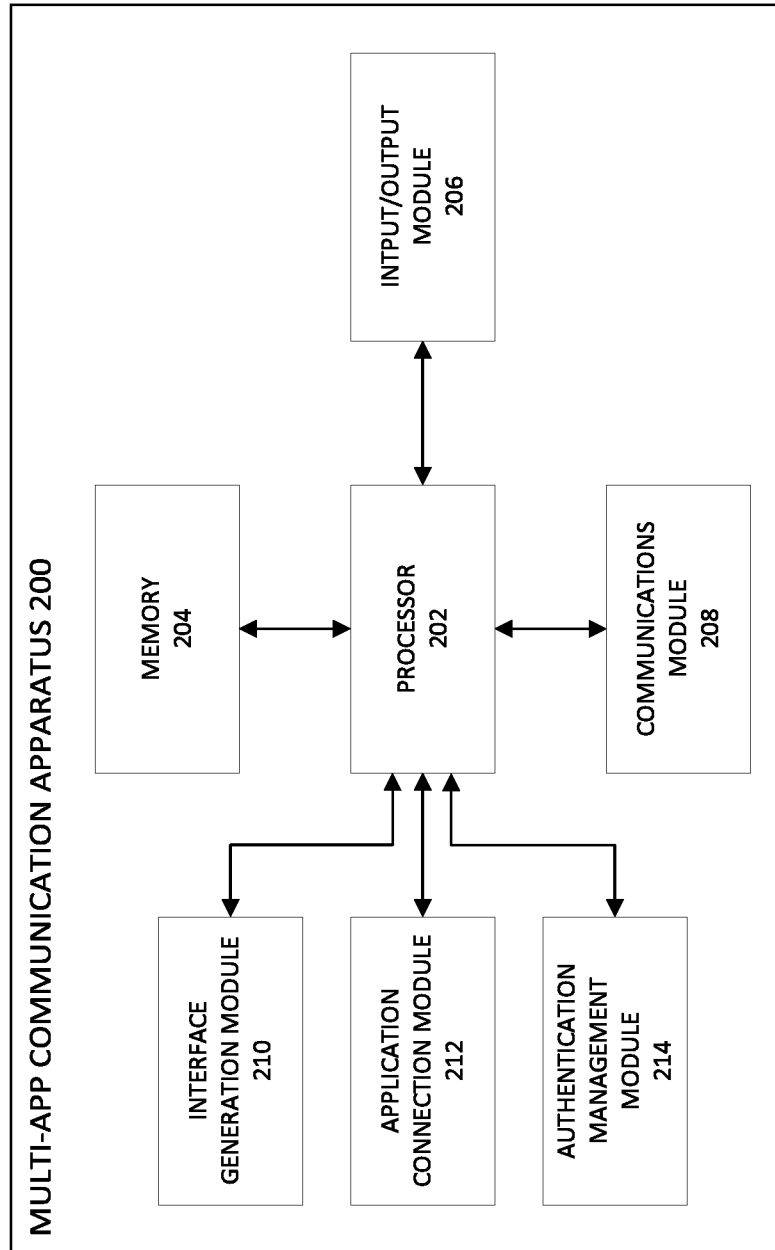
FIG. 2 illustrates a block diagram of a multi-app communication apparatus that may be specially configured in accordance with an example embodiment of the present disclosure.

The MACS 102 may be embodied by one or more computing systems, such as multi-app communication apparatus 200 shown in FIG. 2. As illustrated in FIG. 2, the apparatus 200 may include a processor 202, a memory 204, an input/output module 206, a communications module 208, an interface generation module 210, an application connection module 212, and an authentication management module 214. The apparatus 200 may be configured to execute operations described above with respect to FIG. 1, and below with respect to FIGS. 3-7. Although the components 202-214 are described with respect to functional limitations, it should be understood that the particular implementations necessarily include the use of particular hardware. It should also be understood that certain of these components 202-214 may include similar or hardware. For example, two modules may both leverage use of the same processor, network interface, storage medium, or the like to perform their associated functions, such that duplicate hardware is not required for each module. The use of the terms "module" and/or "circuitry" as used herein with respect to components of the apparatus therefore comprises particular hardware configured with software to perform the functions associated with that particular module, as described herein.

Of course, the terms "module" and/or "circuitry" should be understood broadly to include hardware, in some embodiments, module and/or circuitry may also include software for configuring the hardware. For example, in some embodiments, module and/or circuitry may include processing circuitry, storage media, network interfaces, input/output devices, and the like. In some embodiments, other elements of the apparatus 200 may provide or supplement the functionality of particular module(s). For example, the processor 202 may provide processing functionality, the memory 204 may provide storage functionality, the communications module 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium.) The memory 204 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the terms "processing module" and/or "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output module 206 that may, in turn, be in communication with processor 202 to provide output to the user and, in some embodiments, to receive an indication from the user. The input/output module 206 may comprise a user interface and may include a device display, such as a user device display, that may include a web user interface, a mobile application, a client device, or the like. In some embodiments, the input/output module 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications module 208 may be any means such as a device, module, or circuitry embodied in either hardware or a combination of hardware and software that is configured to receive and/or transmit data from/to a network and/or any other device, circuitry, or module in communication with the apparatus 200. In this regard, the communications module 208 may include, for example, a network interface for enabling communications with a wired or wireless communication network. For example, the communications module 208 may include one or more network interface cards, antennas, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v3.0, Bluetooth Low Energy (BLE), infrared wireless (e.g., IrDA) FREC, ultra-wideband (UWB), induction wireless transmission, or the like. In addition, it should be understood that these signals may be transmitted using Wi-Fi, Near Field Communications (NFC), Worldwide Interoperability for Microwave Access (WiMAX), or other proximity-based communications protocols.

In some embodiments, communications module 208 may facilitate communication between the apparatus 200 and one or more client devices, such as the client devices 104 as illustrated in FIG. 1. For example, communications module 208 may facilitate the transmission of data associated with functionality of the MACS to one or more client device executing a MACS application. Additionally or alternatively, communications module 208 may facilitate communication between the apparatus 200 and one or more third-party resources, including third-party resources 112, verified third-party resources 110, verified email resource 106, and verified multi-factor authentication resource 108.

Interface generation module 210 may be any means such as a device, module, or circuitry embodied in either hardware or a combination of hardware and software that is configured to generate user interfaces, transmit user interfaces to a client device, and/or otherwise receive information from a client device in response to user engagement with one or more user interfaces. In a specific embodiment, interface generation module 210 is configured to generate and/or otherwise retrieve, at least, a multi-app sign-in prompt interface, a third-party resource sign-in prompt interface, and/or an in-app auto-authentication prompt interface. In some embodiments, interface generation module 210 communicates with one or more other modules, such as processor 202 and/or communications module 208, to transmit user interfaces to a client device and cause the client device to render the user interface. It should also be appreciated that, in some embodiments, the interface generation module 210 may include a separate processor, specially configured field programmable gate array (FPGA), or application specific interface circuit (ASIC) to perform the above functions.

Application connection module 212 may be any means such as a device, module, or circuitry embodied in either hardware or a combination of hardware and software that is configured to communicate with, and/or provide functionality associated with, one or more third-party resources and/or one or more verified third-party resources. In some embodiments, application connection module 212 is configured to communicate with one or more third-party resources such that the third-party resources may be integrated with the embodiment MACS. In some embodiments, application connection module 212, alone or together with one or more other modules such as processor 202 and/or communications module 208, is configured to provide functionality associated with one or more verified third-party resources. Additionally or alternatively, in some embodiments, application connection module 212 is configured to provide functionality associated with one or more verified multi-factor authentication resources and/or verified email resources. It should also be appreciated that, in some embodiments, the application connection module 212 may include a separate processor, specially configured field programmable gate array (FPGA), or application specific interface circuit (ASIC) to perform the above functions.

Authentication management module 214 may be any means such as a device, module, or circuitry embodied in either hardware or a combination of hardware and software that is configured to provide user authentication associated with the MACS and/or one or more verified third-party resources. In some embodiments, authentication management module 214 is configured to receive and/or validate user authentication credentials to identify an associated user account. Additionally or alternatively, in some embodiments, authentication management module 214 is configured to communicate with one or more third-party multi-factor authentication resources to cause such the resource to provide a multi-factor confirmation associated with the identified user account. Additionally or alternatively, in some embodiments, authentication management module 214 is configured to extract a multi-factor message code from the multi-factor confirmation message. Additionally or alternatively, in some embodiments, the authentication management module 214 is configured to validate the multi-factor message code. In some embodiments, in response, authentication management module 214 is configured to initiate an authenticated session associated with the MACS. In other embodiments, in response, authentication management module 214 is configured to enable access to a third-party resource during an authenticated session associated with an authenticated user account. In some embodiments, authentication management module 214 is configured to perform one or more user authentication steps with one or more verified third-party resources or third-party resources. For example, authentication management module 214 may be configured to, during an authenticated session associated with an authenticated user account, automatically retrieve authentication credentials, security tokens, or the like, associated with the authenticated user account for the authenticated session, and utilize the retrieve credentials, token, or the like, to perform a primary authentication step associated with a third-party resource during verification.

As will be appreciated, any such computer program instructions and/or other type of code may be loaded onto a computer, processor, or other programmable apparatus' circuitry to produce a machine, such that the computer, processor, or other programmable circuitry that executes the code on the machine creates the means for implementing various functions, including those described herein.

As described above and as will be appreciated based on this disclosure, embodiments of the present disclosure may be configured as systems, methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Each of the client devices 104 may be embodied by one or more computing systems that also may include a processor, a memory, an input/output module, and a communications module. As it relates to operations described in the present disclosure, the functioning of these components may be similar to the similarly named components described above with respect to FIG. 2, and for the sake of brevity, additional description of the mechanics of these components is omitted.

Having described specific components of example devices involved in the present disclosure, an example data flow for a system in which example embodiments of the present disclosure may operate is described below in connection with FIG. 3.

Automatic Multi-factor Authentication Flow

Figure 3:
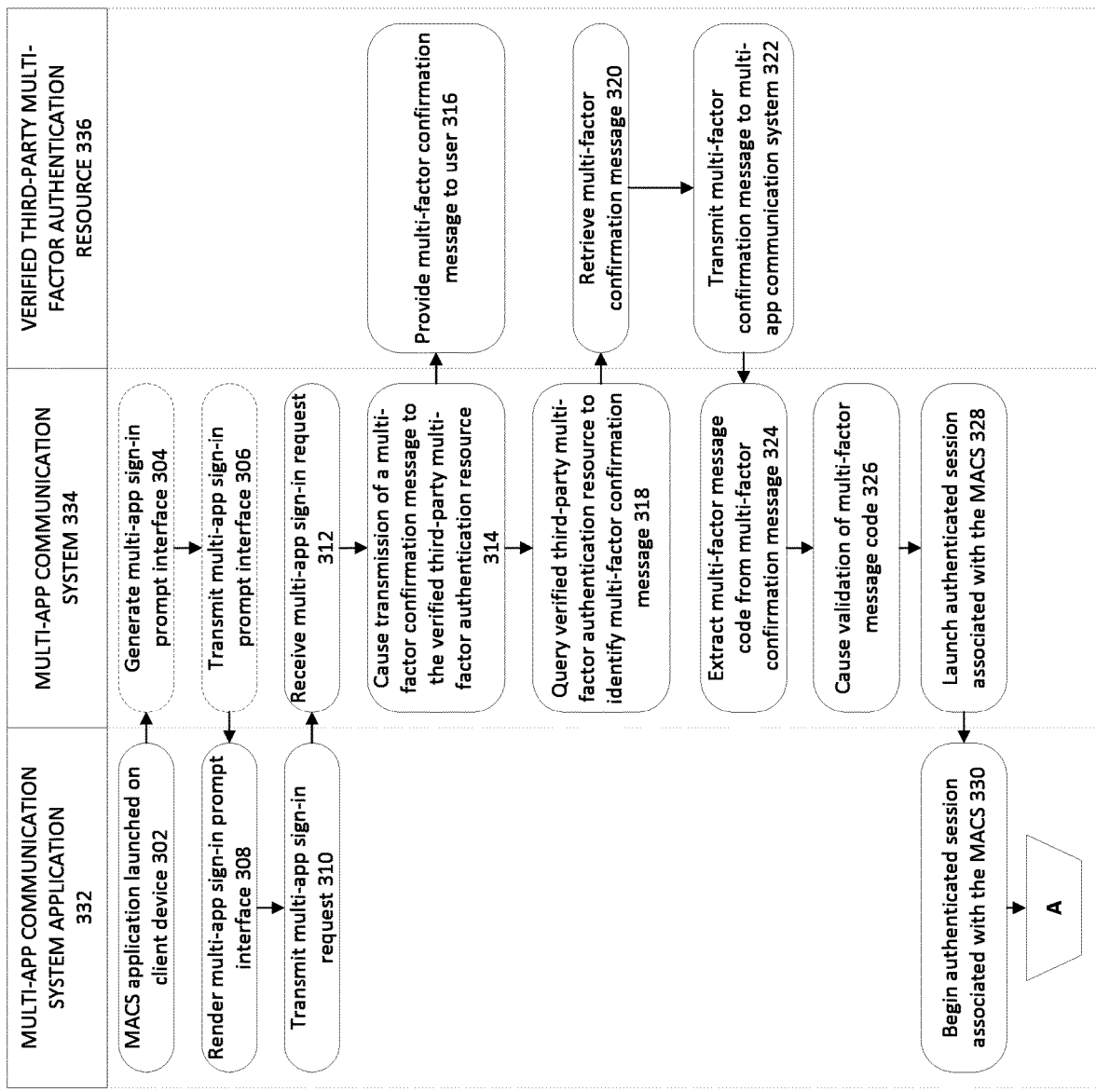
FIG. 3 illustrates an operational data flow diagram depicting operational steps for launching an authentication session associated with an authenticated user account via a multi-app communication system configured in accordance with an example embodiment of the present disclosure.

FIG. 3 illustrates a data flow diagram that contains operational steps for launching, or otherwise initiating, an authentication session associated with a MACS configured in accordance with an example embodiment of the present disclosure. Operations in FIG. 3 may, for example, be performed by a system comprising a MACS application 332, MACS 334, and verified third-party multi-factor authentication resource 336. An example system may include a client device, such as one of the client device 104A, configured to execute MACS application 332. The client device may be configured to communicate with MACS 334 via a network. Additionally, MACS 334 may be configured to communicate with verified third-party multi-factor authentication resource 336 over the same network, or a different network.

In some embodiments, verified third-party multi-factor authentication resource 336 is, or is associated with, a verified email resource. For example, verified third-party multi-factor authentication resource 336 may be a verified email resource that was verified through a manual or automatic verification process.

At step 302, MACS application 332 is executed, initialized, or otherwise launched, on the user device. In some embodiments, a user associated with the client device launches the MACS application 332, such as by executing a software program. In other embodiments, MACS application 332 is automatically launched and executed on the client device.

At step 304, the MACS 334 comprises means, such as interface generation module 210, processor 202, and/or the like, to generate a multi-app sign-in prompt interface. MACS 334 may perform this step in response to information/data received from the MACS application 332 in response to successfully launching at step 302. Subsequently, at step 306, MACS 334 transmits the multi-app sign-in prompt interface to the client device executing the MACS application 332. The MACS 334 transmission may cause the MACS application 332 to render the multi-app sign-in prompt interface in a subsequent step.

At step 308, MACS application 332 renders the multi-app sign-in prompt interface. In some embodiments, the rendered multi-app sign-in prompt interface comprises, at least, one or more interface components configured to receive user authentication credentials, and cause submission of the user authentication credentials to the MACS 334 (for example, via a "submit" button). In some embodiments, steps 304 and 306 are not performed, such that flow immediately continues from step 302 to step 308. For example, in some embodiments, MACS application 332 may be configured to immediately render a multi-app sign-in prompt interface in response to initial launch of the MACS application.

At step 310, MACS application 332 transmits a multi-app sign-in request to MACS 334. In some embodiments, the MACS application is configured to transmit the multi-app sign-in request in response to user engagement with the rendered multi-app sign-in prompt interface. The multi-app sign-in request may indicate the users desire to sign-in and access the MACS 334 for an authenticated session associated with the MACS. In some embodiments, the multi-app sign-in request may also include additional information and/or data associated with user identification and/or authentication that is useful to the MACS. For example, a multi-app sign-in request comprises user authentication credentials. Additionally or alternatively, in some embodiments, a multi-app sign-in request comprises at least a device identifier associated with the client device executing the MACS application 332. Additionally or alternatively, in some embodiments, a multi-app sign-in request comprises at least an application identifier and/or instance identifier associated with the MACS application 332.

In an example embodiment, a MACS 334 receives a multi-app sign-in request automatically. The multi-app sign-in request may include information for identifying an authenticated user account associated with a particular client device, MACS application 332, and/or the like. For example, a MACS application 332 executing on a client device may automatically retrieve and/or determine a device identifier, user authentication credentials, and/or the like, and include this information in a multi-app sign-in request transmitted to the MACS 334. Accordingly, the client device executing the MACS application 332 may be configured to automatically provide necessary user authentication credentials, or equivalent information, for identifying a corresponding authenticated user account.

At step 312, the MACS comprises means, such as communications module 208, authentication management module 214, processor 202, and/or the like, to receive the multi-app sign-in request. In some embodiments, at step 312, the MACS 334 may validate and/or store information included in the received multi-app sign-in request. For example, MACS 334 may validate received user authentication credentials and identify an authenticated user account associated with the received credentials.

At step 314, the MACS 334 comprises means, such as application connection module 212, authentication management module 214, processor 202, communications module 208, and/or the like, to cause transmission of a multi-factor confirmation message to the verified third-party multi-factor authentication resource, specifically verified third-party multi-factor authentication resource 336 as illustrated. For example, in some embodiments, the MACS 334 transmits a multi-factor request to cause a verified third-party multi-factor authentication resource to provide the multi-factor confirmation message to a user, or otherwise make the multi-factor confirmation message available via a third-party multi-factor authentication resource user account. In some embodiments, the MACS 334 may generate the multi-factor confirmation message. The MACS 334 may transmit the multi-factor confirmation message to the verified third-party multi-factor authentication resource 336, for example as part of a multi-factor request transmitted to the verified third-party multi-factor authentication resource 336. For example, in some embodiments, MACS 334 may identify a verified third-party multi-factor authentication resource 336 using the received user authentication credentials, other information received in the multi-app sign-in request, and/or an earlier identified user account, such as a user account identified at step 312. MACS 334 may transmit a multi-factor request to the verified third-party multi-factor authentication resource 336, which may include a multi-factor confirmation message and/or a multi-factor message code.

At step 316, the verified third-party multi-factor authentication resource 336 provides the multi-factor confirmation message to the user. In some embodiments, in response to the multi-factor request, the verified third-party multi-factor authentication resource 336 may generate and/or make available the multi-factor confirmation message associated with a user account. The verified third-party multi-factor authentication resource may identify a user account utilizing information received from the MACS 334, such as information included in the received multi-factor request. In some embodiments, verified multi-factor authentication resource 336 may transmit a response to MACS 334 after providing the multi-factor confirmation message including information associated with the provided multi-factor confirmation message.

At step 318, the MACS 334 comprises means, such as application connection module 212, authentication management module 214, processor 202, communications module 208, and/or the like, to query the verified third-party multi-factor authentication resource to identify the multi-factor confirmation message.

At step 320, the verified multi-factor authentication resources 336 retrieves the multi-factor confirmation provided to the user, and at step 322, transmits the multi-factor confirmation message to the MACS 334. The information transmitted to the MACS 334 may additionally include information identifying the client device that the verified multi-factor authentication resource provided the multi-factor confirmation message to in step 316. For example, the verified third-party multi-factor authentication resource 336 may transmit a device identifier, application instance identifier, or the like, to the MACS 334 as part of, or additional to, the transmission including the multi-factor confirmation message. For example, in some embodiments, a MACS may utilize a webhook to receive new email messages from a verified third-party email resource when the new email message is associated with an email profile associated with the authenticated user account (for example, via a third-party resource authentication token).

At step 324, the MACS 334 comprises means, such as authentication management module 214, application connection module 212, communications module 208, processor 202, and/or the like, to receive the multi-factor confirmation message and extract the multi-factor message code from the multi-factor confirmation message. In some embodiments, the MACS 334 comprises means to parse the received multi-factor confirmation message to identify an authentication link including the multi-factor message code, and extract the multi-factor message code from the multi-factor confirmation message. In some embodiments, the MACS 334 comprises means configured to identify and extract the multi-factor message code utilizing one or more identifiers, prefix, or other text searches.

In some embodiments, a MACS may identify multi-factor confirmation messages and/or parse one or more multi-factor confirmation messages in a myriad of methods. In an example embodiment, a MACS may associate one or more third-party rule sets with a third-party resource. An example third-party rule set may include rules for identifying a multi-factor confirmation message based on information included in the multi-factor confirmation message and/or metadata associated with the multi-factor confirmation message. For example, a third-party rule set may identify a multi-factor confirmation message based on one or more from the group of a sender name associated with the sender of the multi-factor confirmation message, subject text associated with the multi-factor confirmation message (e.g., a subject line of a multi-factor confirmation email message), the message content of the multi-factor confirmation message, an identifier associated with the sender of the multi-factor confirmation message (e.g., an IP address) and/or metadata embedded in the multi-factor confirmation message, and/or the like. A particular third-party rule set may utilize a combination of this information, and/or additional information, to identify a multi-factor confirmation message.

In a particular example, the MACS 334 may associate a first third-party rule set with a first verified third-party multi-factor authentication resource, for example a particular verified email resource. The first third-party rule set may enable the MACS 334 to identify a multi-factor confirmation message based on the sender name, subject line, and message content of the multi-factor confirmation message. The MACS 334 may also associate a second third-party rule set with a second verified third-party multi-factor authentication resource. The second third-party rule set may enable the MACS 334 to identify a multi-factor confirmation message based on sender name and message content of the multi-factor confirmation message. Accordingly, the MACS 334 may use the appropriate third-party rule set associated with a particular third-party multi-factor authentication resource to identify multi-factor confirmation messages provided by that third-party multi-factor authentication resource.

Additionally or alternatively, in some embodiments, the same or an additional third-party rule set may include rules to parse the multi-factor confirmation message to identify a multi-factor message code. For example, in a particular embodiment, a MACS may identify a particular multi-factor confirmation message using a specific third-party rule set associated with the third-party resource, and subsequently parse the multi-factor confirmation message utilizing the third-party rule set. For example, a third-party rule set may include how the third-party resource comprises a multi-factor authentication or other validation information (e.g., as metadata, as part of an authentication link, and/or the like). In some embodiments, a MACS identifies a third-party rule set for identifying and parsing a multi-factor confirmation message. In other embodiments, a MACS identifies a first third-party rule set for identifying a multi-factor confirmation message and a second third-party rule set for parsing an identified multi-factor confirmation message to identify a multi-factor confirmation code.

At step 326, the MACS 334 comprises means, such as authentication management module 214, processor 202, and/or the like, to cause validation of the multi-factor message code. In some embodiments, the MACS 334 is configured to verify the multi-factor message code based on information known or stored by the MACS 334, such as by comparing the multi-factor message code with an earlier stored expected code. Alternatively or additionally, in some embodiments, the MACS 334 transmits the multi-factor message code to a verified third-party resource for validation. The MACS 334 may store information regarding the client device, identified authenticated user account, and/or the like, to enable the client device to readily launch subsequent authenticated sessions without further verification.

Additionally or alternatively, as part of validating the multi-factor message code at step 326 in some embodiments, the MACS 334 may validate that the client device requesting an authenticated session and the client device associated with the multi-factor message code are the same. For example, the MACS may compare one or more instance identifiers associated with the client device and the multi-factor message code. For example, MACS 334 may receive a target instance identifier associated with the client device that transmitted the multi-app sign-in request. The target instance identifier may uniquely identify the client device (e.g., an IP address, IMEI, or other device identifier), or uniquely identify the MACS application instance executed via the client device (e.g., an application instance identifier). The MACS 334 may receive, or otherwise determine, a confirmation instance identifier. The confirmation instance identifier may indicate a client device, or a MACS application executed on a client device, that indicates a client device that has access to the provided multi-factor confirmation message. For example, the MACS 334 may receive the confirmation instance identifier from the verified multi-factor authentication resource 336 associated with the client device provided the multi-factor confirmation message. Alternatively, in some embodiments, the MACS 334 may track one or more trusted confirmation instance identifiers associated with known trusted client devices. For example, a MACS may include one or more known device identifiers associated with trusted client devices. Additionally or alternatively, a MACS may be configured to compare known, trusted locations associated with a client device with a received client device location to determine if the device can access the verified third-party multi-factor authentication resource. If the MACS 334 cannot confirm the client device requesting sign-in can access the multi-factor confirmation message, for example if the target instance identifier and confirmation instance identifier do not match, the MACS 334 may fail to validate and/or otherwise not launch an authenticated session associated with the MACS.

In some embodiments, if the MACS 334 fails to validate the multi-factor message code at step 326, flow does not continue to step 328, and thus may not launch an authenticated session associated with the MACS. In some embodiment, the MACS 334 may transmit a verification failed response to the client device executing the MACS application 332, where the verification failed response indicates that the MACS 334 could not verify information provided by the client device.

At step 328, after successfully validating the user, the MACS 334 comprises means, such as authentication management module 214, processor 202, and/or the like, to launch an authenticated session associated with the MACS. The MACS 334 may configure the authenticated session such that the client device associated with the sign in request may access functionality associated with the MACS 334 through the MACS application 332 executed on the client device. In a particular example embodiment, MACS 334 may configure an authentication token and transmit it to the client device executing MACS application 332. The authentication session, through the authentication token or other means, may be associated with the user account authenticated via the operations in one or more of the previous steps.

In some embodiments, once the user has successfully authenticated, the MACS 334 is configured to enable subsequent authentication automatically. For example, the MACS may store a client device identifier, IP address, and/or other identifying information, associated with an identified authenticated user account. Accordingly, when the MACS receives a subsequent multi-app sign-in request from the client device, the MACS may determine the client device has already been authenticated associated with a particular authenticated user account, and may automatically launch an authenticated session associated with the particular authenticated user account. In some embodiments, the MACS 334 is configured to generate and/or configure an authentication token associated with the authenticated user account, such that the authentication token may be used in place of authentication credentials. The MACS may be configured to store, and/or cause the client device to store, the authentication token associated with the authenticated user account, such that the client device may provide the authentication token to the MACS 334 along with a multi-app sign-in request to facilitate launch of an authenticated session associated with the authenticated user account.

Alternatively, in some embodiments, the MACS launched authenticated session is configured as a one-time session. For example, the MACS may identify that the multi-factor message code is associated with a one-time session. Accordingly, in some embodiments where the authenticated session is a one-time session, the MACS may be configured to not launch any additional or subsequent authenticated sessions associated with the client device without authenticating the user again. The MACS 334 may, for example, not store the client device as a trusted device, and/or otherwise require the user to authenticate to launch subsequent authenticated sessions from the particular client device.

At step 330, the authenticated session associated with the MACS begins. For example, the client device may receive information for accessing the MACS during the authenticated session, for example the authentication token configured by the MACS, and store it, via the MACS application 332. Accordingly, using the MACS application 332, the user may perform functionality requests associated with the MACS 334, during the authenticated session, utilizing the received information such as the authentication token.

Figure 4:
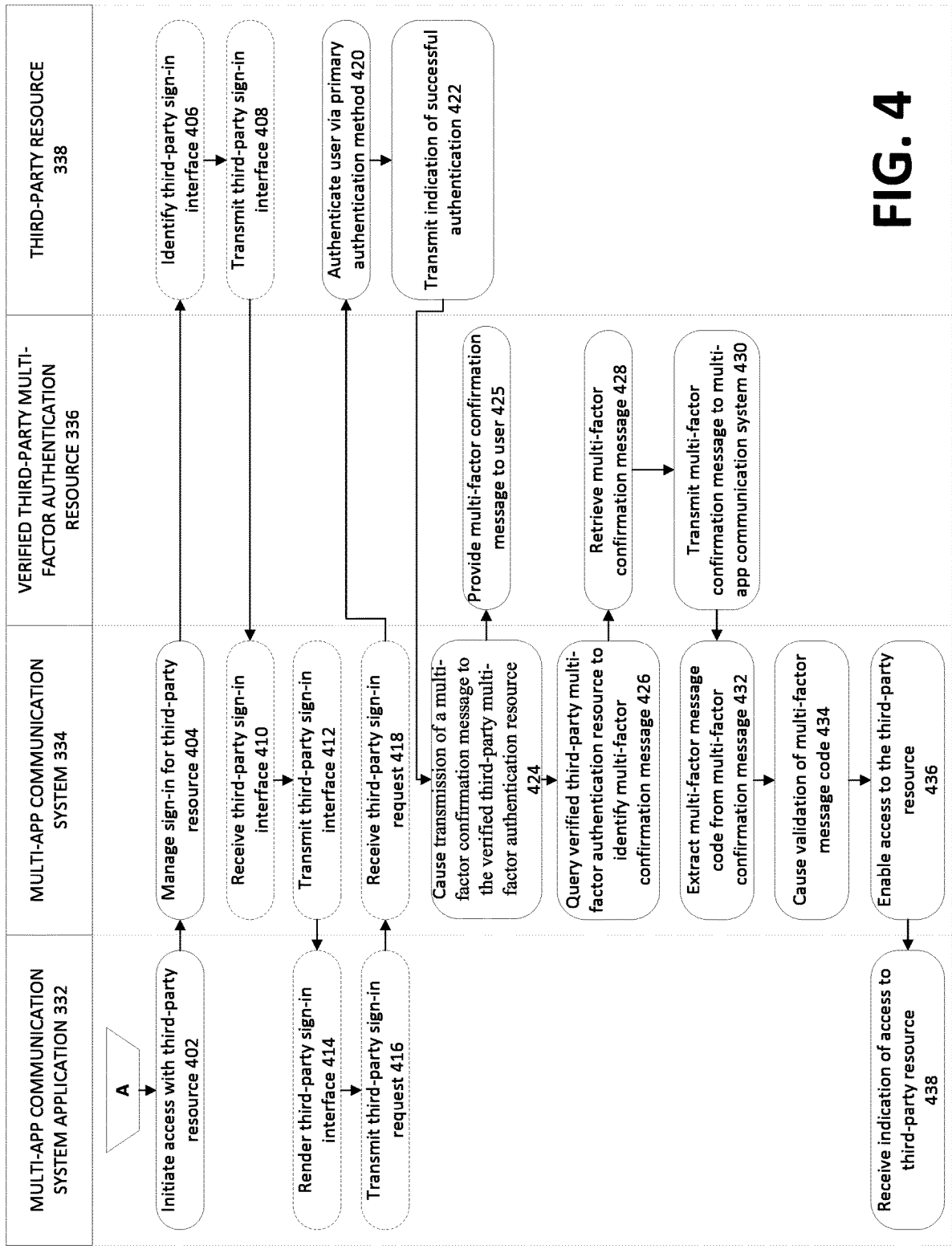
FIG. 4 illustrates an operational data flow diagram depicting operational steps for, during an authenticated session associated with an authenticated user account, verifying a third-party resource via a multi-app communication system configured in accordance with an example embodiment of the present disclosure.

After step 330, the user may, via the MACS application executing on the client device, integrate and/or otherwise verify one or more third-party resources associated with the MACS 334, access functionality associated with the MACS 334, or launch an authenticated session, via the MACS, associated with one or more verified-third party resources associated with the MACS 334 for accessing functionality associated with the one or more verified third-party resources, as discussed below with respect to FIG. 4.

It should be appreciated that the flow illustrated in FIG. 3 is merely an example, and other flows may include alternative steps, additional steps, or an alternative combination of steps. For example, the user device validation described above with respect to step 326 may be performed at step 318, step 324, or another step where all information required to perform the validation has been received. Accordingly, the specific flow illustrated in FIG. 3 is not to limit the scope and spirit of the disclosure.

Third-Party Resource Verification

FIG. 4 illustrates a data flow diagram that contains operational steps for verifying a third-party resource, such that functionality associated with the third-party resource is accessible during an authenticated session associated with an authenticated user account via a MACS configured in accordance with an example embodiment of the present disclosure. Operations in FIG. 4 may, for example, be performed by a system comprising a MACS application 332 executed on a client device (such as the client device 104A), MACS 334, verified third-party multi-factor authentication resource 336, and third-party resource 338. The client device may be configured to communicate with MACS 334 via a network. Additionally, MACS 334 may be configured to communicate with verified third-party multi-factor authentication resource 336, and/or third-party resource 338, over the same network or different networks.

As illustrated, the operations depicted may be performed during an authenticated session associated with the MACS 334, where the authenticated session is associated with an authenticated user account. For example, a user may first have to sign-in and authenticate their client device executing a MACS application, such as through the process illustrated by FIG. 3, a primary authentication method (e.g., signing in with a username and password), after automatically authenticating associated with an authenticated user account, or an alternative process. Accordingly, the operations depicted in FIG. 4, when performed, may be associated with the authenticated user account associated with the authenticated session.

At step 402, a client device associated with the MACS application 332 initiates access and integration with a third-party resource, specifically third-party resource 338 for illustrative purposes. The user, at this step, indicates the user a desire to access functionality associated with the third-party resource. In some embodiments, the user may engage with the MACS application 332 to initiate communication between the MACS and the third-party resource. For example, in some embodiments, the MACS system 334 receives a third-party resource integration request associated with the third-party resource, which may include a third-party resource identifier associated with the third-party resource. In other embodiments, one or more third-party resources are initiated when the MACS 334 launches an authenticated session associated with a user account. The MACS 334 may receive, as part of the information transmitted at this step, a target instance identifier associated with the client device.

At step 404, the MACS 334 comprises means, such as authentication management module 214, application connection module 212, communications module 208, processor 202, and/or the like, to manage sign-in for the verified third-party resource 338. In some embodiments, the MACS 334 may be configured to retrieve a third-party sign-in interface from the third-party resource 338 for presenting to the user via MACS application 332 executed on the user device. In other embodiments, the MACS 334 is configured to automatically provide user credentials and/or otherwise provide information necessary for a primary authentication method associated with the third-party resource 338. For example, the MACS 334 may provide an authentication token, or a primary authentication token, to the third-party resource 338, and/or user account details associated with the authenticated user account associated with the authenticated session (e.g., an email, a device identifier, or the like), such that the user does not input any additional authentication credentials to the third-party resource 338. Accordingly, in some embodiments, flow may proceed directly from step 404 to step 420.

At step 406, the third-party resource 338 identifies a third-party sign-in interface. In some embodiments, the third-party resource 338 generates the third-party sign-in interface. In other embodiments, the third-party resource 338 retrieves the third-party sign-in interface from a database including one or more third-party sign-in interfaces, or data/instructions for generating the third-party sign-in interface. Subsequently, at step 408, the third-party resource 338 transmits the third-party sign-in interface 408 to MACS 334.

At step 410, the MACS 334 comprises means, such as interface generation module 210, application connection module 212, communications module 208, processor 202, and/or the like, to receive the third-party sign-in interface. At step 412, the MACS 334 comprises means, such as interface generation module 210, communications module 208, processor 202, and/or the like, to transmit the third-party sign-in interface to the client device executing the MACS application 332. The MACS 334 may transmit the third-party sign-in interface, or equivalent data, as part of a transmission to the client device executing the MACS application 332, which causes the MACS application 332 to render the third-party sign-in interface.

At step 414, the MACS application 332 renders the sign-in interface to the client device. The rendered third-party sign-in interface may include one or more components configured to receive user authentication credentials. Additionally or alternatively, the rendered third-party sign-in interface may include one or more components configured to facilitate transmission of information to the MACS 334, for example to cause transmission of a third-party sign-in request. In some embodiments, the third-party sign-in interface, via the MACS application 332, may be configured to receive user authentication credentials automatically, for example via a credentials manager, password manager, or the like.

At step 416, the client device, via the MACS application 332, transmits the third-party sign-in request to the MACS 334. In some embodiments, the client device transmits the third-party sign-in request via the MACS application 332 in response to user engagement with the third-party sign-in interface. In some embodiments, the MACS application 332 is configured to transmit the third-party sign-in request in response to user engagement with the rendered third-party sign-in interface. The third-party sign-in request may indicate a user desire to sign-in to, or otherwise access functionality associated with, the third-party resource 338 via the MACS 334. In some embodiments, the third-party sign-in request may also include additional information and/or data associated with user and/or device identification, and/or authentication that is useful to the MACS. For example, a third-party sign-in request may include user authentication credentials. Additionally or alternatively, in some embodiments, a third-party sign-in request comprises at least a target instance identifier associated with the client device executing the MACS application 332. Additionally or alternatively, in some embodiments, a third-party sign-in request comprises at least an application identifier and/or instance identifier associated with the MACS application 332.

At step 418, the MACS 334 comprises means, such as authentication management module 214, communications module 208, processor 202, and/or the like, to receive the third-party sign-in request. The third-party sign-in request may indicate the users desire to sign-in to and validate the third-party resource 338, such that functionality associated with the third-party resource 338 may be accessed via the MACS 334 during an authenticated session associated with the authenticated user account. In some embodiments, the third-party sign-in request may also include additional information and/or data associated with user identification and/or authentication that is useful to the MACS. For example, a third-party sign-in request may include user authentication credentials associated with the third-party resource 338. Additionally or alternatively, in some embodiments, a third-party sign-in request comprises at least a device identifier associated with the client device executing the MACS application 332. Additionally or alternatively, in some embodiments, a third-party sign-in request comprises at least an application identifier and/or instance identifier associated with the MACS application 332.

At step 420, MACS 334 transmits the third-party sign-in request, and/or information received or associated with the third-party sign-in request, to the third-party resource 338, and the third-party resource 338 authenticates the user via a primary authentication method. For example, the MACS 334 may transmit at least the user authentication credentials identified, or received from the client device executing the MACS application 332, to validate that a user is registered with the third-party resource 338 based on the provided user authentication credentials.

At step 422, the third-party resource 338 transmits an indication that the primary authentication method successfully authenticated the user. Additionally or alternatively, the third-party resource 338 may include an authentication token, or other data, associated with the authenticated user account authenticated via the primary authentication method. The third-party resource 338 may also include information indicating multi-factor authentication is required, and/or a verified third-party multi-factor authentication resource associated with the user account authenticated via the primary authentication method. Additionally or alternatively, at this step, the third-party resource may transmit a target instance identifier associated with the client device executing the MACS application 332. At step 424, the MACS 334 comprises means, such as application connection module 212, communications module 208, processor 202, and/or the like, to receive the indication of successful authentication, which may include the target instance identifier, an expected multi-factor message code, and/or other information for validating the multi-factor message code.

At step 424, the MACS 334 comprises means, such as application connection module 212, communications module 208, processor 202, and/or the like, to cause transmission of a multi-factor confirmation message to the verified third-party multi-factor authentication resource, specifically verified third-party multi-factor authentication resource 336 as illustrated. In some embodiments, causing transmission of the multi-factor confirmation message causes the verified third-party multi-factor authentication resource 336 to provide a multi-factor confirmation message to the user, or otherwise make the multi-factor confirmation message available via a third-party multi-factor authentication resource user account. For example, in some embodiments, the MACS 334 may transmit a multi-factor request to the third-party resource 338, where the multi-factor request is configured to cause the third-party resource to generate a multi-factor confirmation message and transmit it to the verified third-party multi-factor authentication resource 336. In other embodiments, the MACS 334 may generate the multi-factor confirmation message and transmit a multi-factor request to the verified third-party multi-factor authentication resource 336 that comprises the multi-factor confirmation message. In some embodiments, the MACS 334 may communicate with the third-party resource 338 to identify a verified third-party multi-factor authentication resource and/or cause the verified third-party multi-factor authentication resource to provide the multi-factor confirmation message. In some embodiments, the MACS 334 causes the third-party resource 338 to transmit information to verified third-party multi-factor authentication resource 336 at step 422, or simultaneously with step 424. For example, the MACS 334 may cause the third-party resource 338 to generate a multi-factor confirmation message, and/or cause the verified third-party resource 338 to cause the verified third-party multi-factor authentication resource 336 to provide the multi-factor confirmation message to the user.

At step 425, the verified third-party multi-factor authentication resource 336 provides the multi-factor confirmation message to the user. The multi-factor confirmation message comprises, at least, a multi-factor message code associated with the user successfully authenticated with the third-party resource via the primary authentication method. In a particular embodiment, verified third-party multi-factor authentication resource 336 is a verified email resource, which provides an email multi-factor confirmation message to an email profile associated with the user authenticated by third-party resource 338 via the primary authentication method. For example, verified third-party multi-factor authentication resource 336 may provide an email message to an email profile associated with an authenticated user account associated with the authenticated session, such as an email profile identified by the MACS 334 or the third-party resource 338.

At step 426, the MACS 334 comprises means, such as application connection module 212, processor 202, communications module 208, and/or the like, to query the verified third-party multi-factor authentication resource 336 to identify the multi-factor confirmation message. In some embodiments, MACS 334 may query the verified third-party multi-factor authentication resource 336 for information, data, and/or messages based on stored verification authentication information, such as a third-party resource authentication token associated with a particular third-party multi-factor authentication resource user account, and/or one or more of a client device identifier, an IP address, an email profile, and/or the like. In some embodiments, the query is performed automatically via a webhook integrated with the verified third-party multi-factor authentication resource 336. In other embodiments, the MACS 334 is configured to query the verified third-party multi-factor authentication resource using one or more APIs, such as at pre-determined intervals.

At step 428, the verified third-party multi-factor authentication resource 336 retrieves the multi-factor confirmation message provided to the user. In some embodiments, the verified third-party multi-factor authentication resource 336 retrieves the multi-factor confirmation message using information provided by the MACS 334. At step 430, the verified third-party multi-factor authentication module 336 provides, such as by transmitting, the multi-factor confirmation message to the MACS 334. The information transmitted to the MACS 334 may additionally include information identifying the client device that the verified multi-factor authentication resource provided the multi-factor confirmation message to in step 425. For example, the verified third-party multi-factor authentication resource 336 may identify and/or transmit additional information along with the multi-factor confirmation message, for example a device identifier, application instance identifier, or the like, to the MACS 334.

At step 432, the MACS 334 comprises means, such as application connection module 212, authentication management module 214, communications module 208, processor 202, and/or the like, to receive the multi-factor confirmation message and extract the multi-factor message code from the multi-factor confirmation message. In some embodiments, the MACS 334 receives the multi-factor confirmation message from the verified third-party multi-factor authentication resource 336 through a webhook. The MACS 334 may be configured to receive all messages provided by the verified third-party multi-factor authentication resource. In some embodiments, the MACS 334 comprises means to parse the received multi-factor confirmation message to identify an authentication link including the multi-factor message code, and extract the multi-factor message code from the multi-factor confirmation message. In some embodiments, the MACS 334 comprises means configured to identify and extract the multi-factor message code utilizing one or more identifiers, prefix, or other text searches. In some embodiments, the MACS 334 may identify one or more third-party rule sets for extracting the multi-factor message code. For example, the MACS 334 may identify a particular third-party rule set for extracting a multi-factor message code transmitted by the verified third-party multi-factor authentication resource 336.

At step 434, the MACS 334 comprises means, such as authentication management module 214, processor 202, and/or the like, to cause validation of the multi-factor message code. In some embodiments, the MACS 334 is configured to verify the code based on information known or stored by the MACS 334, such as by comparing the multi-factor message code with an earlier stored expected code. In some embodiments, the MACS 334 causes the third-party resource 338, or the verified third-party multi-factor authentication resource 336, to validate the multi-factor message code. In an example embodiment, the MACS 334 transmits the multi-factor message code for validation by a third-party resource or third-party multi-factor authentication resource, and receives a validation indication response indicating whether the multi-factor code was successfully validated.

Additionally or alternatively, as part of validating the multi-factor message code at step 434, the MACS 334 may validate that the client device requesting an authenticated session and the client device associated with the multi-factor message code are the same. For example, the MACS may compare one or more instance identifiers associated with the client device and one or more instance identifiers associated with the multi-factor message code. A confirmation instance identifier, for example, may serve as a proxy for a client device that was provided, and thus has access to, the multi-factor confirmation message. The MACS 334 may, in an example embodiment, receive a target instance identifier associated with the client device that transmitted the third-party sign-in request. The target instance identifier may uniquely identify the client device (e.g., an IP address, IMEI, or other device identifier), or uniquely identify the MACS application instance executed via the client device (e.g., an application instance identifier), that is requesting to verify the third-party resource. The MACS 334 may receive, or otherwise determine, the confirmation instance identifier. The confirmation instance identifier may indicate a client device, or a MACS application executed on a client device, has access to the provided multi-factor confirmation message. For example, the MACS 334 may receive the confirmation instance identifier from the verified multi-factor authentication resource 336 associated with the client device that provided the multi-factor confirmation message. Alternatively, the MACS 334 may track one or more confirmation instance identifiers (e.g., client device identifiers, locations associated with trusted client devices, etc) for comparison with a received target instance identifier. For example, the MACS 334 may include one or more confirmation instance identifier associated with a trusted client device, and compare a received target instance identifier. Alternatively or additionally, the MACS 334 may store one or more trusted locations associated with trusted client devices, and may compare a target instance identifier location with the trusted locations to determine if the location is within a trusted proximity, and thus the client device is a trusted client device capable of accessing the third-party multi-factor authentication resource. In some embodiments, if the MACS 334 cannot confirm the client device requesting sign-in can access the multi-factor confirmation message, for example if the target instance identifier and confirmation instance identifier do not match, the MACS 334 may fail to validate and/or otherwise not verify the third-party resource.

In some embodiments, if the MACS 334 fails to validate the multi-factor message code at step 434, flow does not continue to step 436. In some embodiment, the MACS 334 may transmit a verification failed response to the client device executing the MACS application 332, where the verification failed response indicates that the MACS 334 could not automatically validate information associated with the client device and/or authenticated user account.

At step 436, the MACS 334 comprises means, such as authentication management module 214, processor 202, and/or the like, to enable access to the third-party resource 338 during an authenticated session associated with the authenticated user account. The MACS 334, during the authenticated session, may configure the MACS application such that the user may access functionality associated with the MACS 334 through the MACS application 332 executed on the client device. In a particular example embodiment, MACS 334 may receive, from third-party resource 338, and/or configure verified authentication information associated with the third-party resource 338. For example, the verified authentication information may include a third-party resource authentication token, which is associated with the third-party resource and/or a third-party resource user account. The MACS 334 may transmit the verified authentication information, such as the third-party resource authentication token, to the client device executing MACS application 332. Accordingly, requests made or actions taken by the client device executing the MACS application 332 during the authenticated session, utilizing the verified authentication token and/or other means, may be associated with the authenticated user account associated with the authenticated session. For example, the third-party resource authentication token may be used to access functionality associated with the third-party resource, and specifically may be used to access functionality specifically associated with a particular third-party resource user account tied to the third-party resource authentication token.

In some embodiments, the MACS 334 is configured to store information enabling access to the third-party resource 338 (now a verified third-party resource) associated with the authenticated user account. For example, MACS 334 may be configured to store received verification authentication information in a database, such that the verification authentication information is retrievable associated with the authenticated user account. In some embodiments, MACS 334 stores a third-party resource authentication token associated with the authenticated user account, such that the MACS 334 may use the third-party resource authentication token to access the now verified third-party resource during an authenticated session associated with the authenticated user account. The third-party resource authentication token may, additionally or alternatively, be linked to/associated with a third-party resource user account. Accordingly, during a MACS authenticated session associated with an authenticated user account, the user associated with an authenticated user account may access functionality associated with the third-party resource user account via the MACS (e.g., access their specific files or information via the third-party resource).

For example, in a particular embodiment, the third-party resource 338 may provide the MACS 334 with a third-party resource authentication token associated with the provided information. The third-party resource authentication token may be linked to a corresponding third-party resource user account, such that the third-party resource authentication token may be utilized to retrieve information and/or access functionality associated with the third-party resource user account. Accordingly, the MACS 334 may store the third-party resource authentication token associated with the authenticated user account for the authenticated session, such that the third-party resource user account and authenticated user account are linked as well. Accordingly, when a user is accessing the MACS 334 during an authenticated session associated with the authenticated user account, the MACS 334 may retrieve and utilize the third-party resource authentication token to access information and/or functionality via the third-party resource 338 that is specifically associated with the user's corresponding third-party resource user account that has been previously validated.

Alternatively, in some embodiments, the MACS configures the third-party resource to be accessible for a one-time session. Accordingly, the third-party resource may remain verified only for the current authenticated session associated with the authenticated user account, and not for subsequent authenticated sessions associated with the authenticated user account. In other words, the third-party resource is not verified outside the current session, and thus may need to be verified again in subsequent authenticated sessions associated with the authenticated user account. However, during the current authenticated session, the MACS 334 may access functionality associated with the third-party resource 338, and specifically functionality associated with a particular third-party resource user account associated with the third-party resource 338.

For example, in some embodiments, the MACS 334 may identify that the multi-factor message code is configured or associated with enabling access for a one-time session (for example, the multi-factor message code is identified as a limited multi-factor message code). Accordingly, in some embodiments the MACS may enable access associated with the third-party resource during the current authenticated session associated with the authenticated user account, and such access may end at a pre-determined time or when the authenticated session terminates (e.g., when the user terminates the MACS application or signs-out). The MACS 334 may, in such instances, not store verified authentication information associated with the third-party resource 338. Alternatively, the third-party resource 338 may provide limited verified authentication information, such as a limited third-party resource authentication token. The limited verified authentication information may be used to access functionality associated with the third-party resource only for the current session, or for a pre-determined length of time.

At step 438, the MACS application 332 receives indication of access to the third-party resource 336, now verified third-party resource 336. Accordingly, via the MACS application 332, the user may access functionality associated with the newly verified third-party resource 338 via the authenticated session associated with the authenticated user account. For example, the client device may receive information, in response to the third-party sign-in request, for accessing functionality associated with the newly verified third-party resource 338 via the MACS 334. In a particular example, the MACS 334 may provide a third-party resource authentication token for accessing the newly verified third-party resource 338. The user device executing the MACS application 332 may receive the authentication token configured by the MACS and/or verified third-party resource, and store it, via the MACS application 332, such that the third-party resource authentication token may be used to validate subsequent requests during the authenticated session associated with the verified third-party resource 338. Accordingly, using the MACS application 332, the user may access functionality requests associated with the verified third-party resource 338 via the MACS 334 during the authenticated session.

It should be appreciated that the flow illustrated in FIG. 4 is merely an example, and other flows may include alternative steps, additional steps, or an alternative combination of steps. For example, the user device validation described above with respect to step 434 may be performed at step 424, step 418, or another step where all information required to perform the validation has been received. Accordingly, the specific flow illustrated in FIG. 4 is not to limit the scope and spirit of the disclosure.

For illustrative purposes only, one specific example embodiment is disclosed herein with respect to the operations for verifying a third-party resource. In the specific example embodiment, MACS 334 may be a group-based communication system server, for example a Slack® server of Slack Technologies, Inc. A user may have already launched an authenticated session associated with a particular authenticated user account, for example the user's Slack® account, such that the user may access functionality associated with Slack® and one or more verified third-party resources. In the specific embodiment, the verified third-party multi-factor authentication resource 336 may be a verified email resource associated with the authenticated user account. The verified email resource may be hosted on a third-party server, such that the Slack® server is configured to access the verified email resource via one or more APIs. The Slack® server may access the verified email resource to retrieve one or more email messages associated with an email profile tied to the Slack® authenticated user account. In the specific embodiment, the third-party resource 338 may be an unverified third-party resource the user wishes to access via the MACS. For example the third-party resource may be a document management resource (e.g., Dropbox®) hosted on a third-party server, such that the Slack® server may access the third-party resource through the user of one or more APIs. Additionally, in the specific embodiment, the MACS application 332 is a Slack® application executed on a client device, as made available by Slack Technologies, Inc. The Slack® application may be a local/native application executing on the client device or a Slack® web application accessed via a web browser application executing on a the client device. The user may utilize the Slack® application to communicate with the Slack® server in the various operations illustrated with respect to FIG. 4.

In the specific embodiment, the user may authenticate themselves with the Slack® server before performing the operations depicted with respect to FIG. 4. For example, the user may provide a valid username and password, causing the Slack® server to launch an authenticated session associated with the user's corresponding Slack® authenticated user account (leading to block A).

In the specific embodiment, the user may initiate access with a third-party resource through the Slack® application executing on the client device. For example, the user may utilize an Slack® application store and discover a new third-party resource the user would like to use. Alternatively, the user may initiate access with a third-party resource that is verified for other users, for example other users in the same channel, message thread, workspace, or the like. The user may initiate access by engaging with a user interface component configured to transmit a third-party integration request to the Slack® server. The third-party integration request may include a third-party identifier that specifically identifies the new third-party resource to be verified.

The Slack® server may retrieve a third-party sign-in interface from the third-party resource. The third-party sign-in interface may be configured, by the Slack® server or the third-party resource, to receive user authentication credentials associated with the third-party resource. The Slack® server may cause rendering of the third-party sign in interface by transmitting the third-party sign-in interface to the client device executing the Slack® application for rendering. After user authentication credentials are input, such as through a credentials manager or manual engagement by the user, the user may submit these credentials to the Slack® server (for example as part of a third-party sign-in request transmitted at block 416).

The Slack® server, in conjunction with the third-party resource, may authenticate the received user authentication credentials provided by the user. If the user authentication credentials match a third-party resource user account, the user may be authenticated via a primary authentication method and the Slack® server may be notified (e.g., at steps 420 and 422). The Slack® server then may cause the verified email resource to provide a multi-factor confirmation email that comprises a multi-factor message code for completing authentication with the third-party resource. For example, the Slack® server may generate the multi-factor confirmation email and transmit it to the verified email resource, for example as part of a multi-factor request. Alternatively, the Slack® server may cause the third-party resource to transmit a multi-factor request to the verified email resource, which causes the verified email resource to provide a multi-factor confirmation email. In some embodiments, the third-party resource generates the multi-factor confirmation email, and comprises it in a multi-factor request.

The Slack® server then may retrieve the multi-factor confirmation email from the verified email resource. The Slack® server may specifically retrieve a message associated with an email profile linked to the authenticated user account and/or third-party resource user account. For example, the user may have validated an email profile associated with the verified email resource, such that the Slack® server may utilize one or more API requests to retrieve email messages associated with the email profile. For example, the Slack® server may query the verified email resource to identify the multi-factor confirmation email (as illustrated at step 426). The Slack® server may receive the multi-factor confirmation message in response.

The Slack® server then may extract a multi-factor message code from the multi-factor confirmation email (as illustrated at step 432). For example, the multi-factor message code may be specifically tied to the user's particular Slack® server authenticated session, such that the multi-factor message code may be used to authenticate the user with the third-party resource during the authenticated session. For example, the multi-factor message code may be a specially configured alphanumeric string.

In some embodiments, the multi-factor confirmation email may include an authentication link. The authentication link may include the multi-factor message code, or may otherwise be associated with the multi-factor message code such that the multi-factor message code may be extracted from the authentication link. Additionally, the authentication link may be configured to receive user engagement, such that if a user accessed an email service application associated with the verified email resource, they could click, tap, or otherwise engage with the link to transmit the multi-factor message code to the Slack® server. However, the Slack® server may extract the multi-factor message code without user engagement and without the user utilizing a service application associated with the verified email resource. Accordingly, the embodiment improves system efficiency and user experience while maintaining user security.

The Slack® server may then cause validation of the multi-factor message code (as illustrated at step 434). The Slack® server may cause the third-party resource to validate the multi-factor message code by transmitting a request to validate the multi-factor message code to the third-party resource, which causes the third-party resource to validate the multi-factor message code. The Slack server may then receive an authentication success indication in response. Alternatively, the Slack® server may validate the multi-factor message code itself. For example, the Slack® server may store the expected multi-factor message code at an earlier step (e.g., one of the steps 402-432), and compare it with the extracted multi-factor message code.

Upon validation of the multi-factor message code, the Slack® server may be enabled to access the third-party resource during an authenticated session associated with an authenticated user account. For example, the Slack® server may receive third-party authentication information from the third-party resource, where the third-party authentication information may be used in accessing the third-party resource. Specifically, the third-party authentication information may be a third-party resource authentication token from the third-party resource, where the third-party resource authentication token is associated with the Slack® authenticated user account and/or third-party resource user account. Accordingly, the user may access functionality associated with the third-party resource through the Slack® server utilizing the third-party resource authentication token. For example, returning to the document management resource example (e.g., accessing Dropbox® functionality via the Slack® server), the Slack® server may use the third-party resource authentication token to access the third-party resource and retrieve one or more documents stored by the third-party resource. The third-party resource authentication token may link a Slack® authenticated user account and a third-party resource user account. For example, during an authenticated session associated with a particular Slack® authenticated user account, the Slack® server may utilize the third-party resource authentication token to access resources associated with a particular third-party resource user account.

During validation, the Slack® server may also validate that the multi-factor message code is accessible by the client device submitting the third-party sign-in request. The Slack® server may receive, or determine, a target instance identifier from the client device before validating the multi-factor message code. For example, during one of the previous steps (e.g., steps 402-430), the Slack® server may receive a client device identifier, IP address, IMEI, Slack® application instance identifier, or the like, associated with the client device requesting access to the third-party resource. The target instance identifier may be received from the client device directly or from the third-party resource (e.g., the third-party resource may store a target instance identifier associated with trusted client devices for a given third-party resource user account). The Slack® server may also receive, or determine, a confirmation instance identifier associated with a trusted client device configured to access the email profile for the verified email resource that is associated with the verified email resource. For example, the confirmation instance identifier may be received by the verified email resource. The Slack® server may then determine the client device submitting the third-party sign-in request may access the multi-factor message code using the target instance identifier and confirmation instance identifier. For example, the Slack® server may compare the target instance identifier and confirmation instance identifier, and determine the client device has access to the multi-factor confirmation message when the identifiers match.

In some embodiments, the Slack® server may receive identifier information from device management software. Alternatively or additionally, in some embodiments, the Slack® server may receive identifier information from the client device executing a Slack® application, such as a laptop. In some embodiments, a target identifier may be determined based compared to information associated with known trusted devices. Accordingly, the Slack® server may track known client devices associated with each authenticated user account, such that when the Slack® server determines the client device requesting access is a trusted device, validation proceeds.

The Slack® server may store the third-party authentication information (e.g., the third-party resource authentication token) such that it is associated with the Slack® authenticated user account. Accordingly, when the Slack® server launches an authenticated session associated with the Slack® authenticated user account, the Slack® server may be able to retrieve the third-party resource authentication token and utilize it to provide functionality to the user. The third-party resource authentication token may be specifically tied to a third-party resource user account, and accordingly the user may access functionality associated with their third-party resource user account (e.g., may access their documents specifically in the example where the third-party resource is a document management resource) via the Slack® server.

Alternatively, the Slack® server may enable access for a one-time session. For example, the multi-factor message code may specifically be associated with a one-time session (e.g., may be a special code or otherwise indicate that the code is for a one-time session). Accordingly, after validating the multi-factor message code, the Slack® server may be enabled to access the third-party resource only for a limited time, such as the duration of the current authenticated session. The third-party resource may provide a limited third-party resource authentication token, which is only valid during the current authenticated session. Alternatively, the Slack® server may be configured to receive a third-party resource authentication token but not store it. Accordingly, if the access to the third-party resource is enabled for a one-time session, the user may be required to verify the third-party resource during a subsequent authenticated session.

The Slack® server may then indicate to the user that the third-party resource has been verified and is accessible. For example, the Slack® server may provide a confirmation interface that comprises text indicating the third-party resource has been verified and is accessible.

FIG. 5 illustrates another set of example operations for verifying a third-party resource associated with a MACS for access during an authenticated session associated with an authenticated user account. In some embodiments, the operations illustrated with respect to FIG. 5 are performed by an embodiment MACS in accordance with the disclosure herein, such as the apparatus 200. By verifying a third-party resource, the user is able to, via a client device executing a MACS application associated with the authenticated session, access functionality associated with the verified third-party resource. For example, a user may verify a third-party resource for performing document storage and retrieval in the cloud. Accordingly, after verifying the third-party resource, the user may sign-in to the verified third-party resource via the MACS, and perform document storage and retrieval associated with the verified third-party resource via the MACS.

It should be appreciated that, in some embodiments, the operations depicted with respect to FIG. 5 may verify a third-party resource associated with a MACS, a multi-factor authentication resource associated with a MACS, an email resource associated with a MACS, and/or the like. In some embodiments, additional or alternative operations may be performed to verify a particular third-party resource, multi-factor authentication resource, email resource, or the like. For example, in some embodiments, a user may manually perform multi-factor authentication after completing the verification operations illustrated with respect to FIG. 5. In some other embodiments, multi-factor authentication may be performed without user engagement, as described herein, after completing the verification operations illustrated with respect to FIG. 5.

At step 502, the apparatus 200 comprises means, such as application connection module 212, communications module 208, processor 202, and/or the like, to a receive third-party resource integration request associated with an unverified third-party resource. The third-party resource integration request, in some embodiments, comprises a third-party resource identifier that uniquely identifies the third-party resource to be integrated and verified. In some embodiments, the third-party resource integration request is received from a client device executing a MACS application in response to user engagement with a user interface, or user interface component thereof, rendered via the MACS application.

In some embodiments, subsequent authentication may be required by the user to confirm that the user is granting permission for the MACS to communicate with the third-party resource. However, in other embodiments, user permission additional to the third-party resource integration request received at step 502 is not needed. Accordingly, in some embodiments, operations 504, 506, and 508, may not be performed by the embodiment.

In some embodiments, a MACS may be configured to retrieve, from the user via the MACS application executed on the client device, for example, user authentication credentials for validation with the integrated third-party resource. In other embodiments, the MACS may be configured to automatically manage sign-in and authentication with third-party resources on the users behalf, such that obtaining user authentication credentials associated with the newly integrated third-party resource is not needed. Accordingly, in some embodiments, operations 510, 512, and 514 may not be performed by the embodiment.

At step 504, the apparatus 200 comprises means, such as application connection module 212, interface generation module 210, processor 202, and/or the like, to identify a third-party resource access prompt interface. In some embodiments, the MACS embodied by apparatus 200 is configured to retrieve a third-party resource access prompt interface from a database configured to store one or more interfaces. In other embodiments, the MACS embodied by apparatus 200 is configured to generate a third-party resource access prompt interface.

At step 506, the apparatus 200 comprises means, such as interface generation module 210, communications module 208, processor 202, and/or the like, to cause the client device to render the third-party resource access prompt interface via a MACS application executed on the client device. In some embodiments, the MACS embodied by apparatus 200 may be configured to transmit a third-party resource access request including the third-party resource access prompt interface, or equivalent data. A third-party resource access request may be configured such that the MACS embodied by apparatus 200 causes the client device to render the third-party resource access prompt interface in response to receiving the third-party resource access request.

At step 508, the apparatus 200 comprises means, such as application connection module 212, communications module 208, processor 202, and/or the like, to receive a third-party authentication approval. In some embodiments, a client device, via a MACS application executed on the client device, may transmit a third-party authentication approval in response to user engagement with the third-party resource access request, or a sub-component thereof, for example an "allow" button, or similar component that indicates permission to integrate the third-party resource with the MACS.

At step 510, the apparatus 200 comprises means, such as interface generation module 210, application connection module 212, authentication management module 214, communications module 208, processor 202, and/or the like, to identify a third-party resource sign-in interface associated with the unverified third-party resource. In some embodiments, the MACS embodied by apparatus 200 may be configured to request, and receive, the third-party resource sign-in interface from the unverified third-party resource.

At step 512, the apparatus 200 comprises means such as application connection module 212, communications module 208, processor 202, and/or the like, to cause the client device to render the third-party resource sign-in interface via the executed MACS application executed on the client device. In some embodiments, the MACS embodied by apparatus 200 may transmit information or data including the third-party resource sign-in interface. The transmission from the MACS embodied by apparatus 200 may be otherwise configured to cause the client device to render the third-party resource sign-in interface. In some embodiments, the third-party resource sign-in interface is configured to receive user engagement, and/or integrate with one or more credentials managers, such as a password manager or single sign on.

At step 514, the apparatus 200 comprises means, such as application connection module 212, communications module 208, processor 202, and/or the like, to receive a third-party resource sign-in request from the client device executing the MACS application. In some embodiments, the third-party resource sign-in request may include at least user authentication credentials. In some embodiments, a client device, via a MACS application executed on the client device, may transmit the third-party resource sign-in request in response to user engagement with the third-party resource sign-in interface.

At step 516, the apparatus 200 comprises means, such as application connection module 212, authentication management module 214, communications module 208, processor 202, and/or the like, to cause validation of user authentication credentials with the third-party resource. In some embodiments, the MACS embodied by apparatus 200 is configured to automatically manage sign-in by retrieving user authentication credentials associated with the third-party resource without user input. In other embodiments, the MACS embodied by apparatus 200 is configured to extract the user authentication credentials from information transmitted from the client device, for example, from the received third-party resource sign-in request. In some embodiments, the MACS embodied by apparatus 200 comprises means, such as authentication management module 214, application connection module 212, communications module 208, processor 202, and/or the like, to transmit the user authentication credentials, and/or additional or alternative data such as an authentication token associated with the third-party resource, to the third-party resource to facilitate validation.

At decision 518, apparatus 200 may include means, such as application connection module 212, authentication management module 214, communications module 208, processor 202, and/or the like, to receive a response indicating if the user credentials were validated, and determine if the response indicates the user credentials were successfully validated. For example, an embodiment may receive, from a third-party resource, a response including a bit, information, or other data flag that indicates the user credentials were successfully validated. Alternatively or additionally, some embodiments may receive, from the third-party resource, a corresponding user account associated with the third-party resource, or information associated with a corresponding user account.

If, at decision 518, the indication indicates that the user credentials were not successfully validated, flow continues to step 520. At block 520, the apparatus 200 comprises means, such as application connection module 212, authentication management module 214, communications module 208, processor 202, and/or the like, to transmit a third-party resource authentication failure response to the client device executing the MACS application. In some embodiments, the third-party resource authentication failure response is configured to cause the client device to reset a rendered, or previously rendered, third-party resource sign-in interface to receive new user authentication credentials. Flow then continues to block 514, after a new third-party resource sign-in request is transmitted by the client device.

Returning to decision 518, if the indication indicates that the user authentication credentials were successfully validated, flow continues to step 522. At step 522, the apparatus 200 comprises means, such as application connection module 212, authentication management module 214, processor 202, and/or the like, to store information configured to access the third-party resource, based on the received indication. In an example embodiment, the MACS receives information that comprises an authentication token associated with the authenticated user account, such that the authentication token may be used to transmitted to the third-party resource to access functionality provided by the third-party resource and associated with the authenticated user account. In some embodiments, the MACS embodying the apparatus 200 stores information, such as the third-party resource identifier associated with the third-party resource, that indicates the user has successfully verified the third-party resource. Specifically, in an example embodiment, the MACS may store the third-party identifier associated with the user account, or a user account identifier, such that the third-party resource may be identified as verified, and thus functionality associated with the third-party resource may be provided during an authenticated session associated with the authenticated user account.

Detailed Enabling Access Using a Verified
Multi-Factor Authentication Resource

FIG. 6 illustrates a flowchart depicting various operations performed in an example detailed process for enabling access to a MACS, or a third-party resource via a MACS, in accordance with an example embodiment of the present disclosure. Specifically, the process illustrated by FIG. 6 enables access to a MACS or a third-party resource in a secure and efficient manner by utilizing a verified multi-factor authentication resource to automatically perform multi-factor authentication. In some embodiments, the operations illustrated with respect to FIG. 6 are performed by an embodiment MACS, such as the apparatus 200, in accordance with the disclosure herein.

At step 602, the MACS embodied by apparatus 200 comprises means, such as application connection module 212, authentication management module 214, processor 202, communications module 208, and/or the like, to receive a sign-in request from a client device. In some embodiments, the sign-in request may be received in response to user engagement with a sign-in prompt interface rendered to the client device via a MACS application executed on the client device. In other embodiments, the sign-in request is received from the client device automatically, such as in response to a user executing the MACS application on the client device.

The sign-in request may include information for use by the MACS to authenticate the user and/or perform multi-factor authentication. In some embodiments, the sign-in request comprises user authentication credentials associated with the user, or information for use in retrieving user credentials (e.g., a client device identifier, application instance identifier, or the like). Additionally or alternatively, in some embodiments, the sign-in request comprises a target instance identifier, which uniquely identifies the sender client device, the MACS application associated with the sender client device, or the like. The target instance identifier may be, alternatively or additionally in some embodiments, requested by the apparatus from the user device in response to receiving a sign-in request.

To enhance security, in some embodiments, the apparatus 200 comprises means, such as authentication management module 214, application connection module 212, communications module 208, processor 202, and/or the like, to validate, or cause validation of, authentication credentials received, or identified, based on the sign-in request via a primary authentication method. For example, in some embodiments, the MACS may validate a received username and password to identify a user account associated with the username and password. In other embodiments, the MACS may utilize a verified third-party resource to validate the received username and password, such as when the sign-in request is a third-party sign-in request. However, it should be appreciated that in some embodiments, the MACS does not require such primary authentication.

At step 604, the apparatus 200 comprises means, such as application connection module 212, communications module 208, processor 202, and/or the like, to cause transmission of a multi-factor confirmation message to a verified third-party multi-factor authentication resource, where the multi-factor confirmation message comprises a multi-factor message code. In some embodiments, transmitting the multi-factor confirmation message causes the verified third-party multi-factor authentication resource to provide the multi-factor confirmation message to the user, or otherwise make the multi-factor confirmation message available to via a third-party multi-factor authentication resource user account In some embodiments, the apparatus 200 identifies the verified third-party multi-factor authentication resource based on received/identified user authentication credentials, a received target instance identifier, a client device identifier associated with the client device, or other information accessible to the MACS embodied by apparatus 200. In some embodiments, the MACS embodied by apparatus 200 comprises means, such as application connection module 212, authentication management module 214, communications module 208, and/or processor 202, to transmit a multi-factor request to the verified third-party multi-factor authentication resource to cause the verified third-party multi-factor authentication resource to provide the multi-factor confirmation message. In some embodiments, the MACS transmits, for example as part of the multi-factor request or additional to the multi-factor request, information for identifying a user and/or user account associated with the verified third-party multi-factor authentication resource. For example, in some embodiments, the multi-factor request comprises, for example, a device identifier, user authentication credentials received and/or identified based on the sign-in request, an identified email profile associated with an identified user account based on verification using a primary authentication method, or the like.

In some embodiments, the MACS embodied by apparatus 200 may cause a verified third-party multi-factor authentication resource to provide the multi-factor confirmation message by causing a third-party resource to transmit a request, or information, to the verified third-party multi-factor authentication resource. For example, in some embodiments, the third-party resource may be configured to generate, or cause generation of, the multi-factor confirmation message, and transmit, or cause transmission of, the multi-factor confirmation message to the verified third-party multi-factor authentication resource.

At step 606, the apparatus 200 comprises means, such as application connection module 212, authentication management module 214, communications module 208, processor 202, and/or the like, to query the verified third-party multi-factor authentication resource to identify the multi-factor confirmation message. In a particular embodiment, the verified third-party multi-factor authentication resource is a verified email resource. The apparatus 200 may, for example, identify an email profile associated with the user based on the received user authentication credentials, an identified user account based on a primary authentication method, or the like, and query the verified email resource for the multi-factor confirmation message associated with the email profile.

For example, in some embodiments, a MACS may be configured to verify a third-party multi-factor authentication resource and link, or otherwise associate, an authenticated user account with a third-party multi-factor authentication resource user account for the third-party multi-factor authentication resource. In an example embodiment, when a user successfully verifies a third-party multi-factor authentication resource for the first time, such as by providing credentials associated with a third-party multi-factor authentication resource user account, the MACS may receive verification authentication information from the third-party multi-factor authentication resource. The verification authentication information may be specifically associated with a particular third-party multi-factor authentication resource, such that the MACS may use the verification authentication information to access information and/or functionality specifically associated with the third-party authentication resource user account associated with the verification authentication information. The verification authentication information may, in a particular example, include a third-party resource authentication token that is specifically configured to enable access to information and/or functionality associated with a corresponding third-party multi-factor authentication resource user account.

The MACS may store the verification authentication information associated with a particular MACS authenticated user account. Accordingly, the MACS may use verification authentication information to query for messages, including multi-factor confirmation messages, from a particular verified third-party multi-factor authentication resource during an authenticated session associated with an authenticated user account. By using particular verification authentication information (e.g., one or more third-party resource authentication tokens associated with the authenticated user account), the MACS may query for messages provided by the verified third-party multi-factor authentication resource to a corresponding third-party multi-factor authentication resource user account. In a particular example using an email resource, a user may verify an email resource during an authenticated session associated with an authenticated user account, and the MACS may receive a third-party resource authentication token, where the third-party resource authentication token is linked with an email profile that the user authenticated during verification. In other words, the third-party resource authentication token may be used to access information and/or functionality provided to the linked third-party multi-factor authentication resource user account. Continuing this particular example, the MACS may store the third-party resource authentication token so it is retrievable during an authenticated session associated with the authenticated user account, and subsequently retrieve the third-party resource authentication token to query for new email messages provided to the email profile linked to the third-party resource authentication token (e.g., the email profile associated verified by the user during verification. In some embodiments, verification authentication information comprises multiple third-party resource authentication tokens, such as a third-party authentication access token, a third-party authentication refresh token, and the like.

At decision 608, the apparatus comprises means, such as authentication management module 214, processor 202, and/or the like, to determine if the multi-factor confirmation message comprises an authentication link. It should be appreciated that a multi-factor message code may be included in multi-factor confirmation message in a myriad of ways. For example, in some embodiments, a multi-factor message code may be included as part of an authentication link (which may be configured for user engagement in some embodiments), as text, as metadata, or as other parts of the multi-factor confirmation message. Thus, while only two possibilities are depicted with respect to FIG. 6, it should be appreciated that these are examples and do not limit the scope and spirit of the disclosure herein.

A multi-factor confirmation message may include a multi-factor message code. The multi-factor confirmation message may be accessible via a service application associated with the verified third-party multi-factor authentication resource (e.g., a verified email resource and corresponding web, or native, application). The multi-factor message code may be manually input, in some systems, by the user via the MACS application executed on the client device. Such methods leave users vulnerable to user experience issues (e.g., distraction, timeout, and the like) and technology issues (e.g., access issues, connectivity issues, and the like), associated with accessing the verified third-party multi-factor authentication resource through a corresponding service application, or accessing the multi-factor confirmation message via the corresponding service application. Accordingly, some embodiments of the present disclosure remove user engagement steps associated with accessing a multi-factor authentication message via a corresponding service application, enables the MACS to automatically authenticate a user and/or authenticated user account corresponding to the multi-factor message code without user engagement, thus enhancing system efficiency and user experience.

An authentication link may be configured to cause the client device to provide the multi-factor message code to the MACS. For example, in some embodiments, an authentication link is configured to cause the client device to provide the multi-factor message code to the MACS in response to user engagement (e.g., a click, tap, touch, or other gesture associated with the authentication link). However, to access the authentication link, the user may be required to leave, or otherwise navigate away from, the MACS application. Accordingly, such methods leave users vulnerable to user experience issues (e.g., distraction, timeout, and the like) and technology issues (e.g., access issues, connectivity issues, and the like), associated with accessing the verified third-party multi-factor authentication resource through a corresponding service application, or accessing the multi-factor confirmation message including the authentication link. Accordingly, embodiments of the present disclosure removes user engagement steps associated with accessing an authentication link, and enables automatic authentication of the corresponding multi-factor message code, thus enhancing system efficiency and user experience.

Embodiment MACS systems may identify multi-factor confirmation messages and/or parse one or more multi-factor confirmation messages in a myriad of methods. In an example embodiment, a MACS may associate one or more multi-factor message rule sets with a third-party resource. An example third-party rule set may include rules for identifying a multi-factor confirmation message based on information included in the multi-factor confirmation message and/or metadata associated with the multi-factor confirmation message. For example, a third-party rule set may identify a multi-factor confirmation message based on one or more from the group comprising the sender of the multi-factor confirmation message, subject text associated with the multi-factor confirmation message (e.g., a subject line of a multi-factor confirmation email message), information provided in the body of the multi-factor confirmation message, an identifier associated with the sender of the multi-factor confirmation message (e.g., an IP address) and/or metadata embedded in the multi-factor confirmation message, and/or the like.

Additionally or alternatively, in some embodiments, the same or an additional third-party rule set may include rules to parse the multi-factor confirmation message to identify a multi-factor message code. For example, in a particular embodiment, a MACS may identify a particular multi-factor confirmation message using a specific third-party rule set associated with the third-party resource, and subsequently parse the multi-factor confirmation message utilizing the third-party rule set. For example, a third-party rule set may include how the third-party resource comprises a multi-factor authentication or other validation information (e.g., as metadata, as part of an authentication link, and/or the like). In some embodiments, a MACS identifies a third-party rule set for identifying and parsing a multi-factor confirmation message. In other embodiments, a MACS identifies a first third-party rule set for identifying a multi-factor confirmation message and a second third-party rule set for parsing an identified multi-factor confirmation message to identify a multi-factor confirmation code.

If, at decision 608, the apparatus 200 determines the multi-factor confirmation message does not include an authentication link, flow continues to step 610. At step 610, the apparatus 200 comprises means, such as authentication management module 214, processor 202, and/or the like, to extract a multi-factor message code from the multi-factor confirmation message. For example, the apparatus 200 may be configured to perform one or more text searches, along with additional or alternative operations, to identify and extract the multi-factor confirmation message. In some embodiments, the apparatus 200 may be configured to perform one or more actions to extract the multi-factor message code based on an identified third-party rule set.

If, at decision 608, the apparatus 200 determines the multi-factor confirmation message does not include an authentication link, flow continues to step 612. At step 612, the apparatus 200 comprises means, such as authentication management module 214, processor 202, and/or the like, to parse the multi-factor confirmation message to identify the authentication link.

At step 614, the apparatus 200 comprises means, such as authentication management module 214, processor 202, and/or the like, to extract the multi-factor message code from the authentication link. For example, the apparatus 200 may be configured to identify the multi-factor message code as a query parameter associated with the authentication link. In some embodiments, the apparatus 200 may be configured to perform one or more actions to identify a third-party rule set and extract the multi-factor message code based on the identified third-party rule set.

At step 616, apparatus 200 comprises means, such as authentication management module 214, application connection module 212, processor 202, and/or the like, to validate the multi-factor message code to identify an authenticated user account. In some embodiments, the apparatus 200 may identify a confirmation instance identifier associated with the multi-factor confirmation message, and use the confirmation instance identifier to verify the client device requesting sign-in has access to the multi-factor confirmation message. In some embodiments, for example, the MACS embodied by apparatus 200 may identify a confirmation instance identifier, and verify that the confirmation instance identifier matches an earlier received, or identified, target instance identifier associated with the received sign-in request. By verifying the client device was provided, or otherwise can access, the multi-factor confirmation message, system security is enhanced, as a client device cannot utilize the automatic multi-factor authentication to bypass this step if the client device access to the multi-factor confirmation message/verified third-party multi-factor authentication resource. In some embodiments, the MACS embodied by apparatus 200 may be configured to verify that the confirmation instance identifier and/or the target instance identifier is associated with a client device associated with the identified user account based on received, or identified, user authentication credentials.

At step 618, the apparatus 200 comprises means, such as authentication management module 214, processor 202, and/or the like, to enable access associated with an authenticated user account. In some embodiments, where the sign-in request received is a multi-app sign-in request, the MACS may launch an authenticated session associated with the authenticated user account. The authenticated session may be associated with a particular authenticated user account of the MACS, such that, during the authenticated session, the user may access functionality associated with the MACS, or associated with one or more verified third-party resources associated with the authenticated user account, such that, during the authenticated session associated with the authenticated user account, the user may access functionality associated specifically with the verified third-party resource they have verified via the MACS. The authenticated session may also be associated with an authenticated user account, such that all requests and/or transactions that occur during the authenticated session may be attributed to, or associated with, the authenticated user account. In some embodiments, where the sign-in request received is a third-party sign-in request associated with a third-party resource being verified, the MACS may enable access to the third-party resource by receiving, identifying, or otherwise determining verification information associated with the third-party resource. For example, the MACS may receive, from the third-party resource, a third-party authentication token associated with the authenticated user account, and the MACS may store the third-party resource authentication token associated with the authenticated user account such that the third-party resource authentication token may be retrieved and used to enable access to the now verified third-party resource during one or more authenticated sessions associated with the authenticated user account.

In some embodiments, to further enhance system security, the MACS embodied by apparatus 200 may be configured to notify a user, on one or more client devices, that the MACS successfully performed multi-factor validation automatically, and/or give the one or more client devices a method to revoke such access.

Accordingly, in some embodiments, at step 620, the apparatus 200 comprises means, such as authentication management module 214, interface generation module 210, processor 202, and/or the like, to generate an in-app auto-authentication prompt interface configured to, in response to engagement, transmit an in-app auto-authentication response. In some embodiments, the in-app auto-authentication prompt interface comprises a confirmation component, configured to transmit an in-app auto-authentication approval in response to engagement with the component (for example user engagement), and a revocation component, configured to transmit an in-app auto-authentication revocation in response to engagement with the component (for example, user engagement). The in-app auto-authentication prompt interface may additionally include a prompt message indicating that the user has been automatically validated using multi-factor authentication, and that asks the user if they would like to continue or revoke access.

At step 622, the apparatus 200 comprises means, such as authentication management module 214, processor 202, communications module 208, and/or the like, to cause one or more client device to render the in-app auto-authentication prompt interface. In some embodiments, the authenticated user account is associated with one or more trusted client devices, such as client devices where a user has already authenticated. An embodiment MACS may identify one or more of the trusted client devices and cause the one or more trusted devices to render the in-app auto-authentication prompt interface. For example, the MACS may transmit information or data including the in-app auto-authentication prompt interface to a client device, where the transmission is configured to cause the client device to render the in-app auto-authentication prompt interface upon receiving the transmission. In some embodiments, the MACS causes a second client device to render the in-app auto-authentication prompt interface, where the second client device is different than the client device requesting sign-in. Accordingly, embodiments enhance security associated with the system by allowing trusted devices associated with a particular authenticated user account to revoke access granted associated with a new sign-in. For example, a MACS may cause a laptop device associated with an authenticated user account to render the in-app auto-authentication prompt interface via a MACS application executing on the laptop device, such that a legitimate user may revoke access to a second device where a malicious user has validated automatically via a new device and begun an authenticated session.

In some embodiments, at decision 624, the MACS embodied by apparatus 200 comprises means, such as application connection module 212, processor 202, communications module 208, and/or the like, to receive an in-app auto-authentication response. In some embodiments, if the user does not respond to the in-app auto-authentication prompt interface within a predetermined time, or dismisses the in-app auto authentication prompt interface, the MACS embodied by apparatus 200 may determine that no authentication response was received, and the flow ends.

If an in-app auto-authentication response is received, flow continues to decision 626. At decision 626, the MACS embodied by apparatus 200 comprises means, such as application connection module 212, authentication management module 214, processor 202, and/or the like, to determine if the response is an in-app auto-authentication revocation. In some embodiments, an in-app auto-authentication revocation may indicate it is a revocation based on a flag, such as a bit flag or other information flag.

If the in-app auto-authentication response is not an in-app auto-authentication revocation, flow ends after decision 626. If the in-app auto-authentication response is determined to be an in-app auto-authentication revocation, flow continues to step 628.

At step 628, the apparatus 200 comprises means, such as application connection module 212, authentication management module 214, processor 202, and/or the like, to terminate the access enabled at step 618. For example, if, at step 618, the MACS launched an authenticated session associated with the authenticated user account, the MACS may terminate the authenticated session at step 628. Alternatively, if at step 618 the MACS enabled access to a third-party resource during the authenticated session, the MACS may terminate the access to the third-party resource at step 628. In some embodiments, the apparatus 200 may be configured to destroy, invalidate, or otherwise terminate information used to validate transmissions and/or requests during the authenticated session, such as an authentication token associated with the earlier authenticated user account, to terminate the enabled access. Additionally, in some embodiments, the MACS embodied by apparatus 200 is configured to, for future sign-in requests, remember the termination, such that the MACS and will not automatically perform multi-factor authentication associated with sign-in requests from the particular client device/associated with the authenticated user account, until the user further indicates a desire to have multi-factor authentication automatically validated.

Automatically Accessing Access Notifications
Received Via a Verified Third-Party Resource In addition to automatically performing multi-factor authentication to verify one or more third-party resources, for example one or more verified multi-factor authentication resources, embodiments in accordance with the disclosure herein may be configured to identify an action notification and perform one or more actions associated with the action notification, for example provide a multi-app communication system interface corresponding to the received action notification. An action notification may, for example, be provided via a the MACS itself, a verified third-party resource, or a newly verified third-party resource. For example, a verified email resource may provide one or more action notifications associated with the MACS and/or one or more other third-party resources. An embodiment MACS may be configured to identify the received action notification via the verified email provider, and cause, via a MACS application executed on a client device, the client device to render a MACS interface based on the action notification.

In a particular example embodiment, when a new user action is performed via the MACS or a verified third-party resource, a user of the MACS may receive an email message via a verified third-party resource (e.g., their email provider). The action notification may include text indicating that a new user action was performed that affects the user of the MACS. For example, an action notification may indicate that the user received a new message from another user, another user has updated information accessible to the user via a verified third-party resource, or the like. The action notification may, alternatively or additionally, include information for accessing a MACS interface associated with the action notification, such as a link that the user may engage to quickly access a MACS interface displaying information associated with the action notification. For example, if the action notification is associated with a second user updating a file accessible to a first user via a verified third-party resource, a corresponding MACS interface may facilitate access to the updated file through the MACS application.

FIG. 7 illustrates a flowchart depicting various operations performed in an example process for automatically providing a MACS interface, via a MACS application executed on a client device, in response to parsing an email message including an action notification, in accordance with an example embodiment of the present disclosure.

At step 702, the MACS verifies the email resource, such that the MACS may communicate with the verified email resource on behalf of the user associated with the client device. For example, an unverified email resource may be verified in accordance with the operations illustrated above with respect to FIG. 4 or 5. Alternatively, in some embodiments, the MACS may already be associated with a verified email resource for a given authenticated user account, such that the verified email resource may be accessed during an authenticated session associated with the authenticated user account.

At step 704, the MACS verifies the third-party resource, such that the MACS may communicate with the verified third-party resource on behalf of the user associated with the client device. For example, an unverified third-party resource may be verified in accordance with the operations illustrated above with respect to FIG. 4 or 5. In some embodiments, the MACS may already be associated with the verified third-party resource for a given authenticated user account, such that the verified third-party resource may be accessed during an authenticated session associated with the authenticated user account. In some embodiments, such as where the action notification is associated with an new user action associated with the MACS itself, no third-party resource needs to be verified. Accordingly, in some embodiments, step 704 is optional.

At step 706, the MACS queries the verified email resource for an email message associated with an action notification. In an example embodiment, the MACS may be configured to query the verified email resource for email messages associated with the MACS and/or one or more verified third-party resource based on a pre-determined schedule (e.g., every 5 minutes, or more generally, every X minutes or seconds, where X is a number). Alternatively, in some embodiments, the MACS may be configured to query the verified email resource for every new email message associated with the MACS and/or one or more verified third-party resource, and provided by the verified email resource. For example, in some embodiments, a MACS may utilize a webhook to receive new email messages from a verified third-party email resource when the new email message is associated with an email profile associated with the authenticated user account (for example, via a third-party resource authentication token).

At step 708, the MACS is configured to receive a selected email message associated with an action notification. The selected email message may include a new action notification associated with the verified third-party resource. For example, where the verified third-party resource is a document management resource, the new selected email message may include an action notification indicating that a user has uploaded a new document to a folder associated with the user of the MACS during an authenticated session. In some embodiments, the selected email message is a multi-factor confirmation message including an action notification. In some embodiments, the MACS is configured to parse one or more messages received to identify a selected email message associated with an action notification.

In some embodiments, the MACS may be configured to identify a selected email messages associated with an action notification based on a pre-defined rule set. For example, a pre-determined rule set may be associated with each verified third-party resource, where each pre-determined rule set describes the information necessary for determining a selected email notification is associated with an action notification. Accordingly, the MACS may retrieve one or more email messages, and identify a selected email message for a given verified third-party resource utilizing the pre-determined rule set associated with the verified third-party resource. An example pre-determined rule set used to select an email message may be based on the sender of an email message, the format of an email message (e.g., subject, body, and the like), one or more expected Uniform Resource Locators (URLs) within the email message, one or more expected codes within the email message, and/or the like.

At step 710, the MACS is configured to parse the selected email message to identify the action notification. For example, the MACS may parse the selected email message to identify a link action notification, where the link is configured to be engaged with and navigate the user to a MACS interface associated with the action notification.

At step 712, the MACS may identify a MACS interface associated with the action notification. For example, the MACS may identify a MACS interface configured to display the action performed associated with the verified third-party resource, and/or perform functionality associated with the verified third-party resource, via the MACS, associated with the performed action. For example, continuing the example where the verified third-party resource is a document management resource, if a user uploads and/or shares a new file with the user, the MACS interface identified may be configured to display the new file and/or enable the user to download and/or edit the file via the MACS.

At step 714, the MACS may cause the client device to render, via a MACS application executed on the client device, the identified MACS interface associated with the action notification. For example, the MACS may transmit the identified MACS interface, or corresponding data representing the MACS interface, to the client device via the MACS application. The client device may render the received MACS interface via the MACS application upon receipt of the transmission from the MACS.

The operations described above with respect to FIG. 7 are described specifically with respect to a verified email resource and a corresponding email message associated with an action notification for purposes of illustration only. It should be appreciated that, in some embodiments, another message type may be associated with an action notification (e.g., a push notification, a chat message, and the like). Additionally, it should be appreciated that, in some embodiments, another type of verified third-party resource may provide a corresponding message type other than an email message. Accordingly, the specific embodiment illustrated in FIG. 7 should not be taken to limit the scope and spirit of the present disclosure.

It will be appreciated that certain steps illustrated in FIGS. 3-7 may be performed by several systems, by independent systems, or by a combination of systems. Additionally or alternatively, in some embodiments, the steps alternative operations, alternative operations, and/or a different arrangement of operations may be performed by embodiments within the scope of the disclosure herein. As such, the specific flows illustrated in FIGS. 3-7 are merely exemplary, and are not for purposes of limitation.

CONCLUSION

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. One or more non-transitory computer-readable media storing computer-executable instructions that, when executed by at least one processor, perform a method of verifying a third-party resource by a multi-app communication system, the method comprising:

launching a multi-app communication system application on a client device, wherein the multi-app communication system application is configured to provide a user associated with an authenticated user account with authenticated engagement with one or more third-party resources including the third-party resource;

generating a sign-in prompt and causing for display the sign-in prompt by the multi-app communication system application;

receiving a multi-app sign-in request from the multi-app communication system application;

causing transmission of a multi-factor confirmation message to the third-party resource via a third-party multi-factor authentication resource associated with the third-party resource based on the multi-app sign-in request, wherein the third-party multi-factor authentication resource is configured to generate the multi-factor confirmation message;

querying the third-party resource to identify the multi-factor confirmation message;

receiving the multi-factor confirmation message including a multi-factor message code;

extracting the multi-factor message code from the multi-factor confirmation message; and enabling access to the third-party resource by the user via the multi-app communication system application based on the multi-factor message code.

2. The media of claim 1, wherein the method further comprises:

launching an authenticated session associated with an authenticated user account, wherein the multi-app sign-in request is received during the authenticated session, and wherein the access to the third-party resource is enabled during the authenticated session.

3. The media of claim 2, wherein the third-party resource is a verified email resource and wherein the method further comprises utilizing a webhook to receive an automatic email verification when the verified email resource is associated with the authenticated user account.

4. The media of claim 2, wherein the method further comprises:

receiving verified resource information associated with the third-party resource, wherein the verified resource information is configured to enable access to the third-party resource; and storing the verified resource information associated with the authenticated user account.

5. The media of claim 1, wherein the method further comprises:

transmitting a third-party multi-factor authentication resource access request;

causing the client device, via the multi-app communication system application, to render a third-party multi-factor authentication resource access prompt interface; and receiving third-party multi-factor authentication resource access approval in response to user engagement with the third-party multi-factor authentication resource access prompt interface.

6. The media of claim 1, wherein the method further comprises:

launching an authenticated session;

generating an in-app auto-authentication prompt interface in response to launching the authenticated session;

causing a second client device to render the in-app auto-authentication prompt interface; and receiving an in-app auto-authentication approval in response to user engagement with the in-app auto-authentication prompt interface.

7. The media of claim 1, wherein the method further comprises:

parsing the multi-factor confirmation message to identify an action notification; and causing the client device, via the multi-app communication system application executed on the client device, to render a multi-app communication system interface associated with the action notification.

8. A method of verifying a third-party resource by a multi-app communication system, the method comprising:

launching a multi-app communication system application on a client device, wherein the multi-app communication system application is configured to provide a user associated with an authenticated user account with authenticated engagement with one or more third-party resources including the third-party resource;

generating a sign-in prompt and causing for display the sign-in prompt by the multi-app communication system application;

receiving a multi-app sign-in request from the multi-app communication system application;

causing transmission of a multi-factor confirmation message to the third-party resource via a third-party multi-factor authentication resource associated with the third-party resource based on the multi-app sign-in request, wherein the third-party multi-factor authentication resource is configured to generate the multi-factor confirmation message;

querying the third-party resource to identify the multi-factor confirmation message;

receiving the multi-factor confirmation message including a multi-factor message code;

extracting the multi-factor message code from the multi-factor confirmation message; and enabling access to the third-party resource based on the multi-factor message code.

9. The method of claim 8, further comprising:

launching an authenticated session associated with an authenticated user account, wherein the multi-app sign-in request is received during the authenticated session, and wherein the access to the third-party resource is enabled during the authenticated session.

10. The method of claim 9, wherein the third-party resource is a verified email resource; and further comprising utilizing a webhook to receive an automatic email verification when the verified email resource is associated with the authenticated user account.

11. The method of claim 9, further comprising:
receiving verified resource information associated with the third-party resource, wherein the verified resource information is configured to enable access to the third-party resource; and
storing the verified resource information associated with the authenticated user account.

12. The method of claim 8, further comprising:
transmitting a third-party multi-factor authentication resource access request;
causing the client device, via the multi-app communication system application, to render a third-party multi-factor authentication resource access prompt interface; and
receiving third-party multi-factor authentication resource access approval in response to user engagement with the third-party multi-factor authentication resource access prompt interface.

13. The method of claim 8, further comprising:
launching an authenticated session;
generating an in-app auto-authentication prompt interface in response to launching the authenticated session;
causing a second client device to render the in-app auto-authentication prompt interface; and
receiving an in-app auto-authentication approval in response to user engagement with the in-app auto-authentication prompt interface.

14. The method of claim 8, further comprising:
parsing the multi-factor confirmation message to identify an action notification; and
causing the client device, via the multi-app communication system application executed on the client device, to render a multi-app communication system interface associated with the action notification.

15. A multi-app communication system for verifying a third-party resource, comprising:
at least one processor;
at least one data store associated with the at least one processor; and
one or more non-transitory computer-readable media storing computer-executable instructions that, when executed by the at least one processor, perform a method of verifying the third-party resource, the method comprising:
launching a multi-app communication system application on a client device, wherein the multi-app communication system application is configured to provide a user associated with an authenticated user account with authenticated engagement with one or more third-party resources including the third-party resource;
generating a sign-in prompt and causing for display the sign-in prompt by the multi-app communication system application;
receiving a multi-app sign-in request from the multi-app communication system application;
causing transmission of a multi-factor confirmation message to the third-party resource via a third-party multi-factor authentication resource associated with the third-party resource based on the multi-app sign-in request, wherein the third-party multi-factor authentication resource is configured to generate the multi-factor confirmation message;
querying the third-party resource to identify the multi-factor confirmation message;
receiving the multi-factor confirmation message including a multi-factor message code;
extracting the multi-factor message code from the multi-factor confirmation message; and
enabling access to the third-party resource based on the multi-factor message code.

16. The multi-app communication system of claim 15, wherein the method further comprises:
launching an authenticated session associated with an authenticated user account, wherein the multi-app sign-in request is received during the authenticated session, and
wherein the access to the third-party resource is enabled during the authenticated session.

17. The multi-app communication system of claim 16, wherein the third-party resource is a verified email resource and wherein the method further comprises perform utilizing a webhook to receive an automatic email verification when the verified email resource is associated with the authenticated user account.

18. The multi-app communication system of claim 15, wherein the method further comprises:
transmitting a third-party multi-factor authentication resource access request;
causing the client device, via the multi-app communication system application, to render a third-party multi-factor authentication resource access prompt interface; and
receiving third-party multi-factor authentication resource access approval in response to user engagement with the third-party multi-factor authentication resource access prompt interface.

19. The multi-app communication system of claim 15, wherein the method further comprises:
launching an authenticated session;
generating an in-app auto-authentication prompt interface in response to launching the authenticated session;
causing a second client device to render the in-app auto-authentication prompt interface; and
receiving an in-app auto-authentication approval in response to user engagement with the in-app auto-authentication prompt interface.

20. The multi-app communication system of claim 15, wherein the method further comprises:
parsing the multi-factor confirmation message to identify an action notification; and
causing the client device, via the multi-app communication system application executed on the client device, to render a multi-app communication system interface associated with the action notification.

* * * * *